United States Patent [19]

Boyette

[11] Patent Number: 5,097,328
[45] Date of Patent: Mar. 17, 1992

[54] APPARATUS AND A METHOD FOR SENSING EVENTS FROM A REMOTE LOCATION

[76] Inventor: Robert B. Boyette, 2064 Allenwood Rd., Wall, N.J. 07719

[21] Appl. No.: 598,376

[22] Filed: Oct. 16, 1990

[51] Int. Cl.⁵ ............................................. H04N 7/18
[52] U.S. Cl. ..................................... 358/108; 358/105
[58] Field of Search ................. 358/108, 105, 93, 125, 358/126

[56] References Cited

U.S. PATENT DOCUMENTS

| | | | |
|---|---|---|---|
| 4,081,830 | 3/1978 | Mick et al. | 358/105 |
| 4,249,207 | 2/1981 | Harman et al. | 358/108 |
| 4,455,550 | 6/1984 | Iguchi | 340/525 |
| 4,458,266 | 7/1984 | Mahoney | 358/105 |
| 4,679,077 | 7/1987 | Yuasa | 358/108 |
| 4,692,806 | 9/1987 | Anderson et al. | 358/209 |
| 4,737,847 | 4/1988 | Araki et al. | 358/108 |
| 4,774,570 | 9/1988 | Araki | 358/108 |
| 4,791,486 | 12/1988 | Spriggs et al. | 358/138 |
| 4,807,027 | 2/1989 | Muto | 358/108 |
| 4,862,264 | 8/1989 | Wells et al. | 358/138 |
| 4,908,704 | 3/1990 | Fujioka et al. | 358/108 |
| 4,924,416 | 5/1990 | Sasao | 358/108 X |

*Primary Examiner*—Victor R. Kostak
*Attorney, Agent, or Firm*—Ratner & Presita

[57] ABSTRACT

A remote sensing system suitable for use in businesses which include queues and/or servers has a camera which captures successive images of the area to be monitored. The sensing system includes one or more video cameras which generate an array of pixel samples representing an image of the area. Sub-areas of interest in the image are defined by selectively illuminating each of the sub-areas during an initialization phase. During operation, the system analyzes pixel data from only the defined sub-areas. A combination of blob analysis and motion analysis is used to determine if a server is on-duty and present at his station, and if he is serving a customer. The system also maintains a count of the number of people waiting in the queue to be served. This information is used to generate displays directing waiting customers to the next available server and to inform newly arriving customers of their expected waiting time. The remote sensing system may also be used in an office environment to detect changes initiated by a worker or inherent in his work to gather performance statistics on the worker.

19 Claims, 16 Drawing Sheets

INITIALIZATION PROCESS

MAIN PROCESS

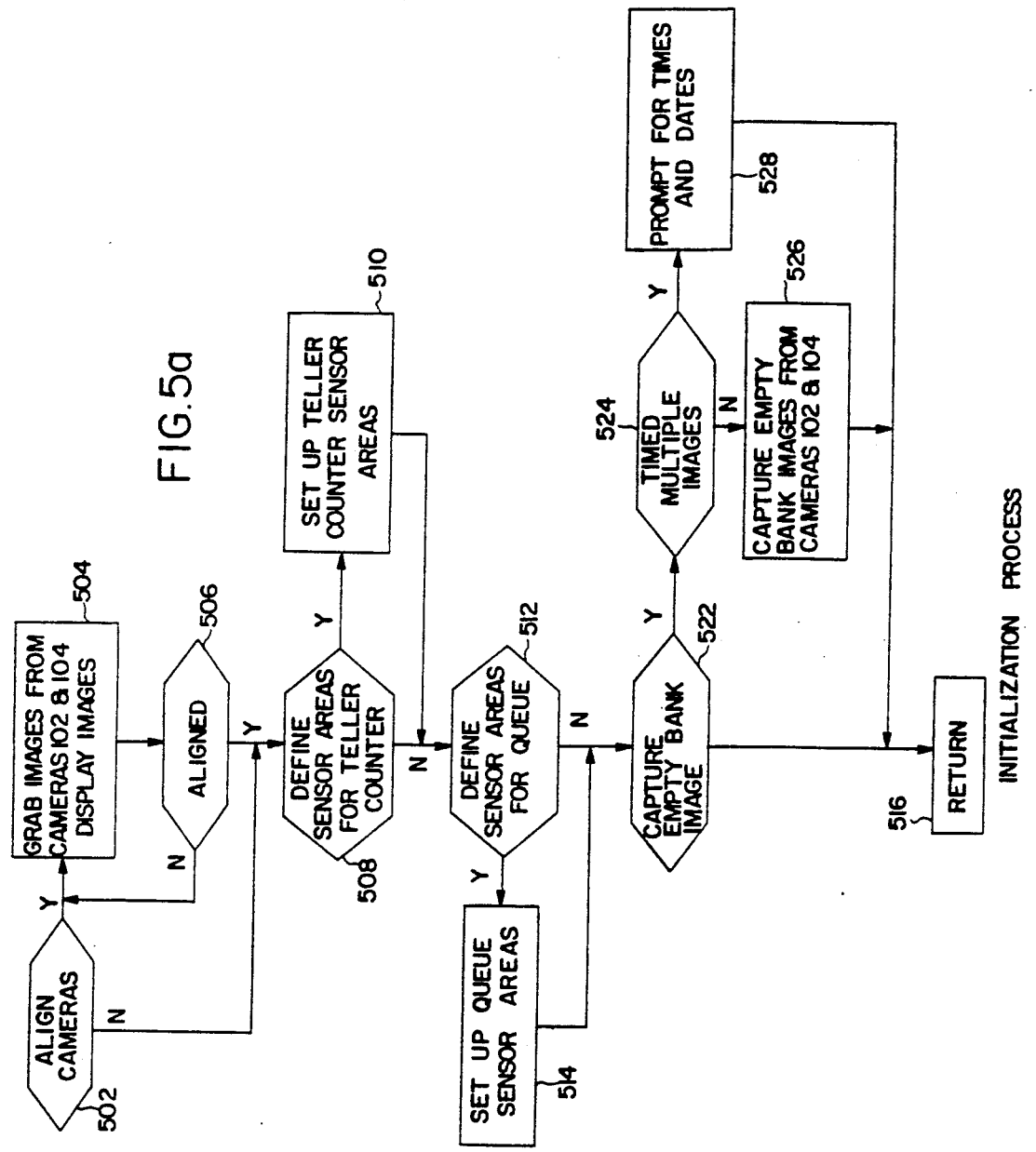

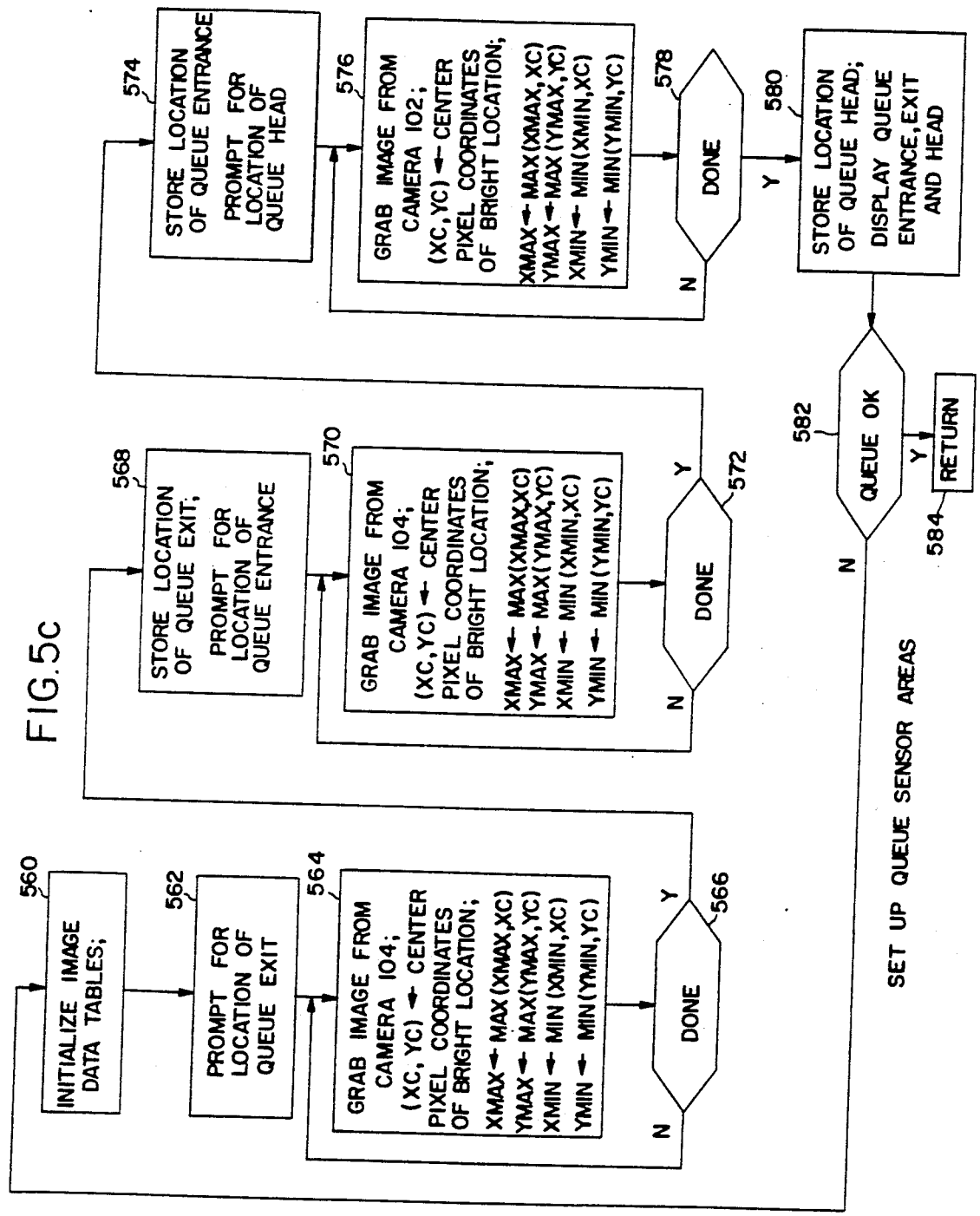

TELLER COUNTER PROCESS

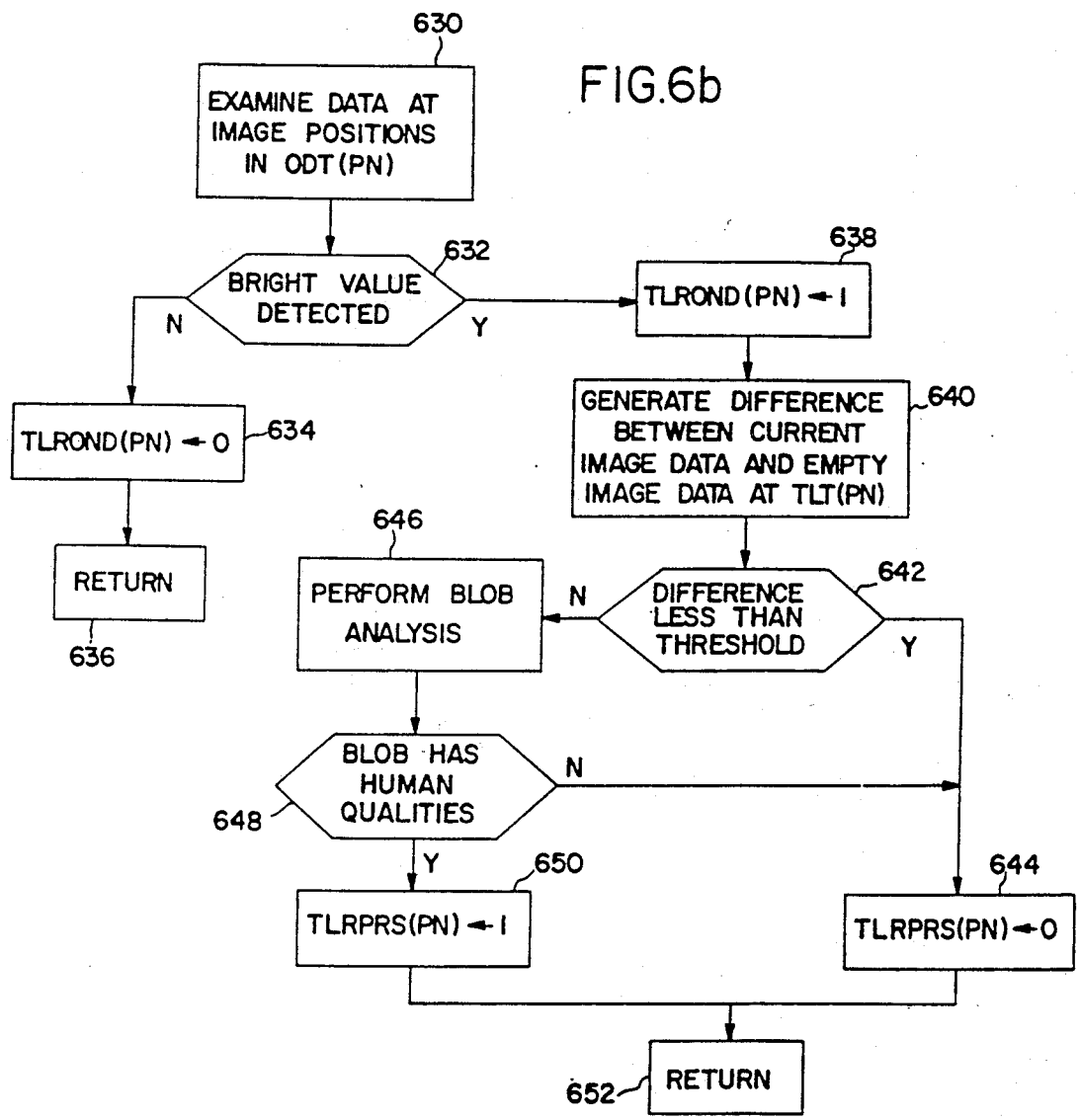
GET TELLER DATA PROCESS

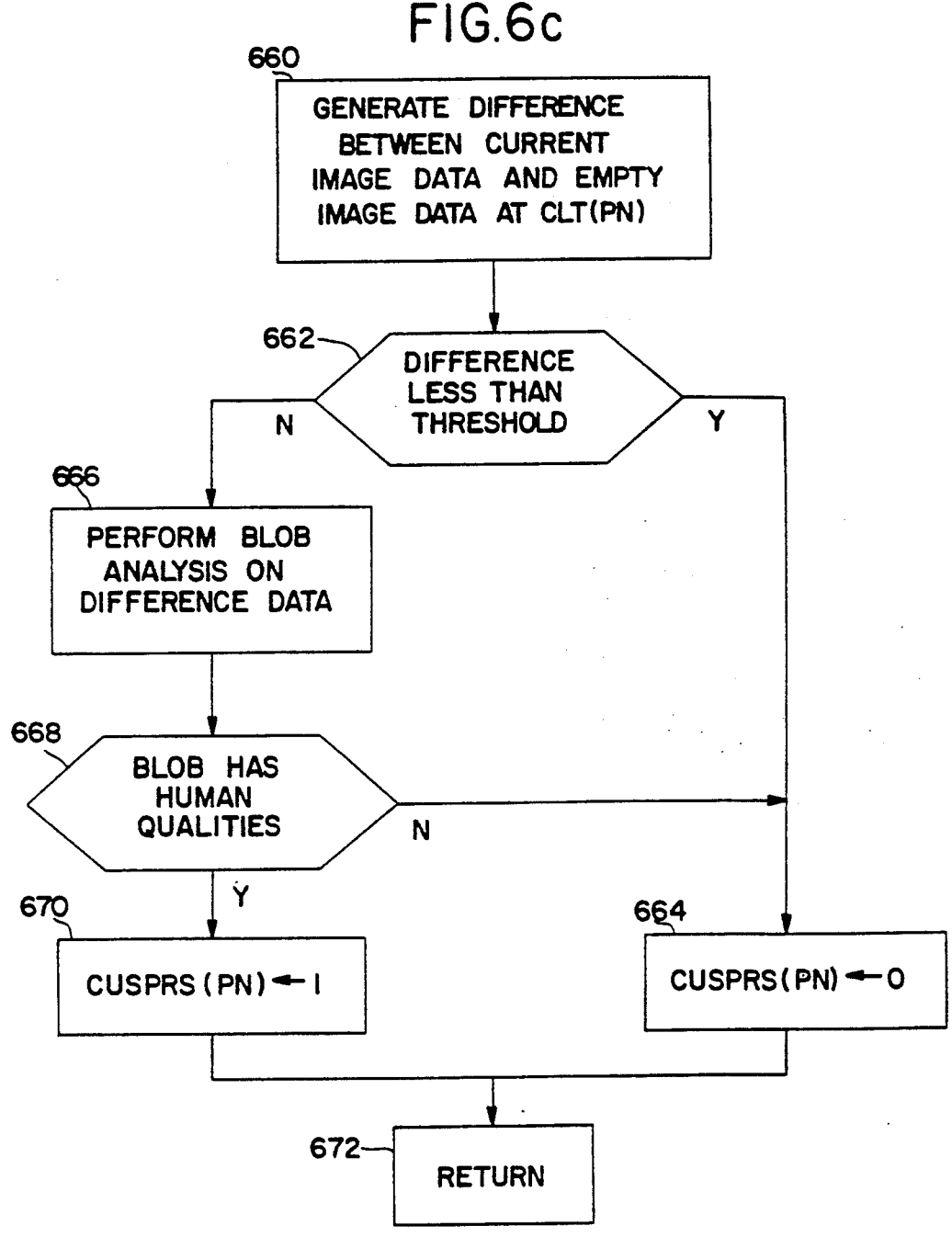
GET CUSTOMER DATA PROCESS

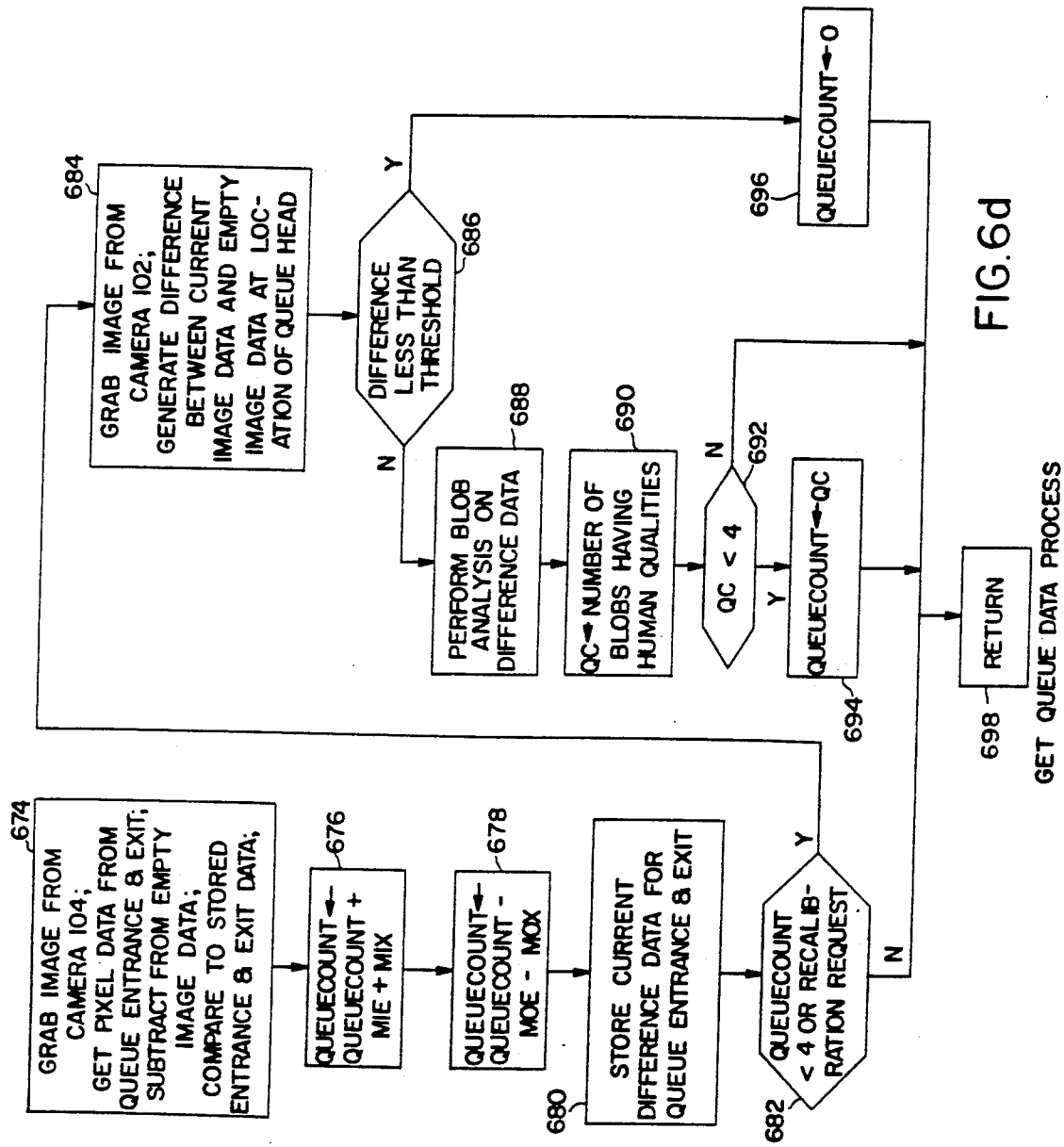
FIG.6d GET QUEUE DATA PROCESS

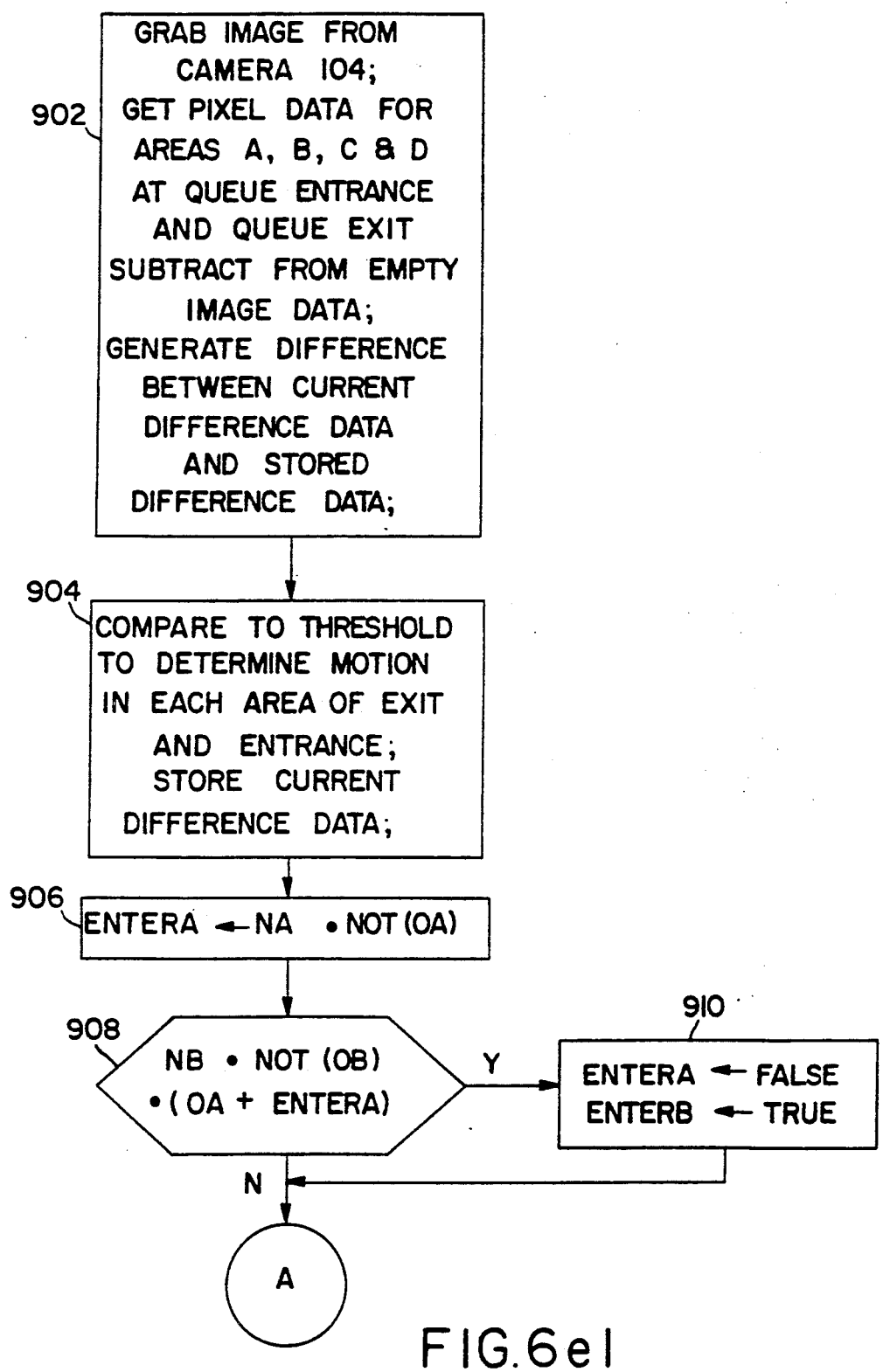
FIG. 6e1

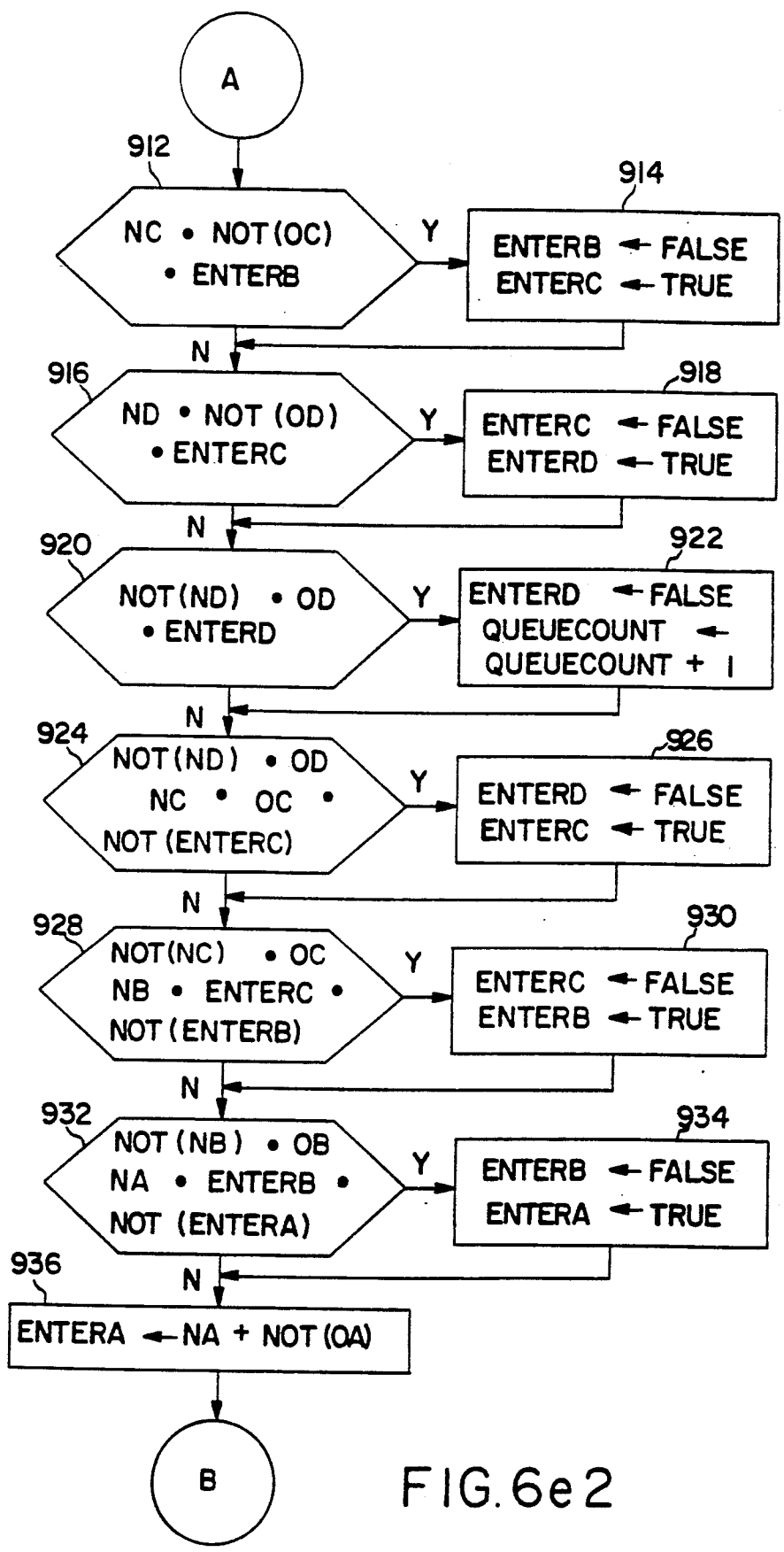
FIG. 6e2

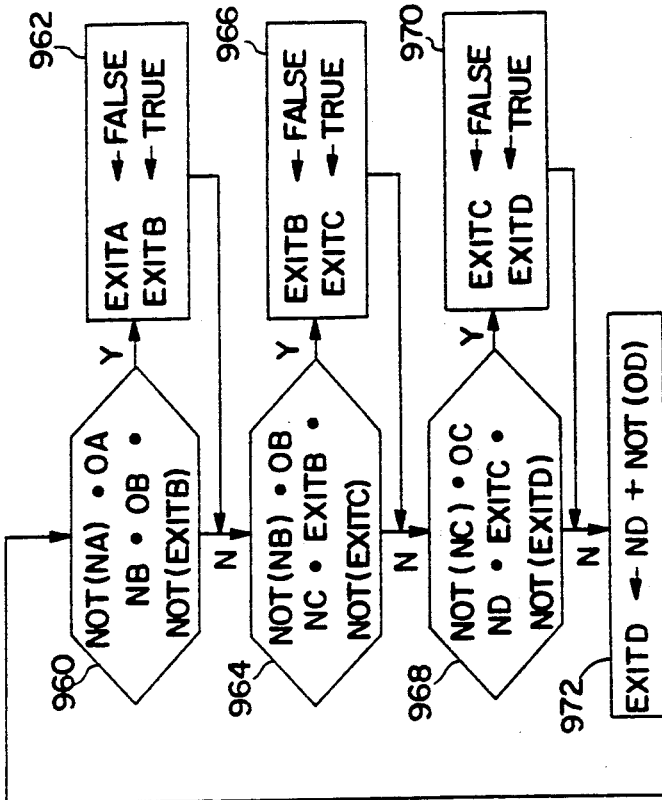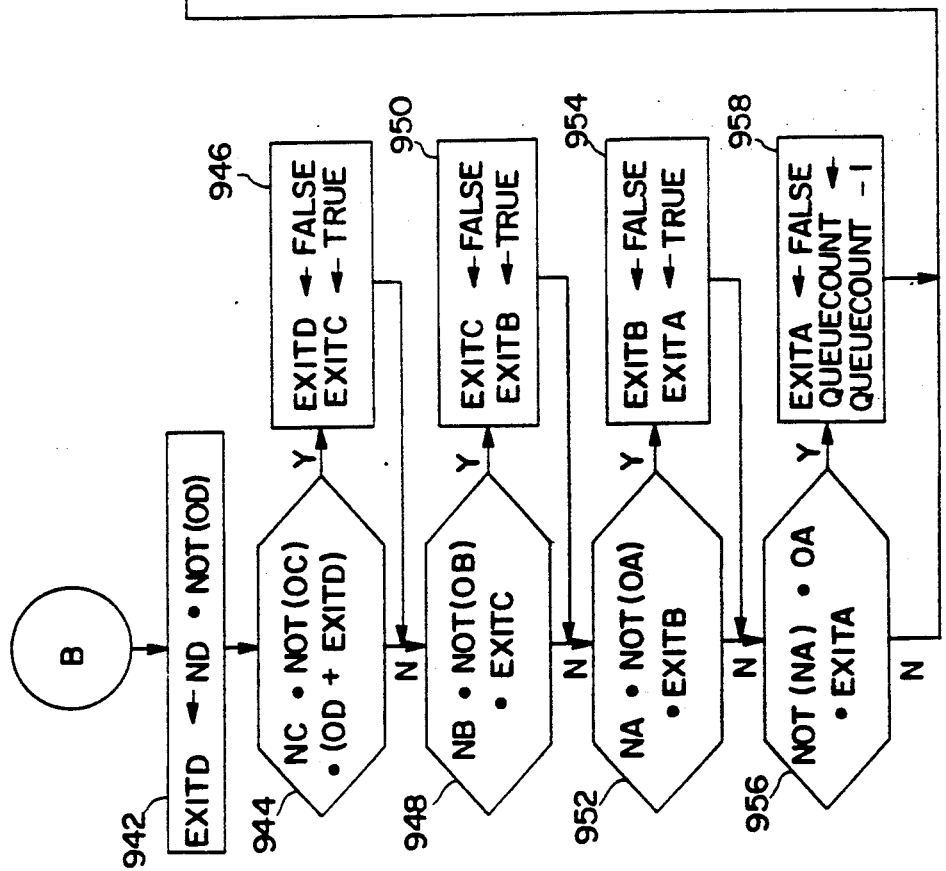
FIG.6e3

COLLECT STATISTICS PROCESS

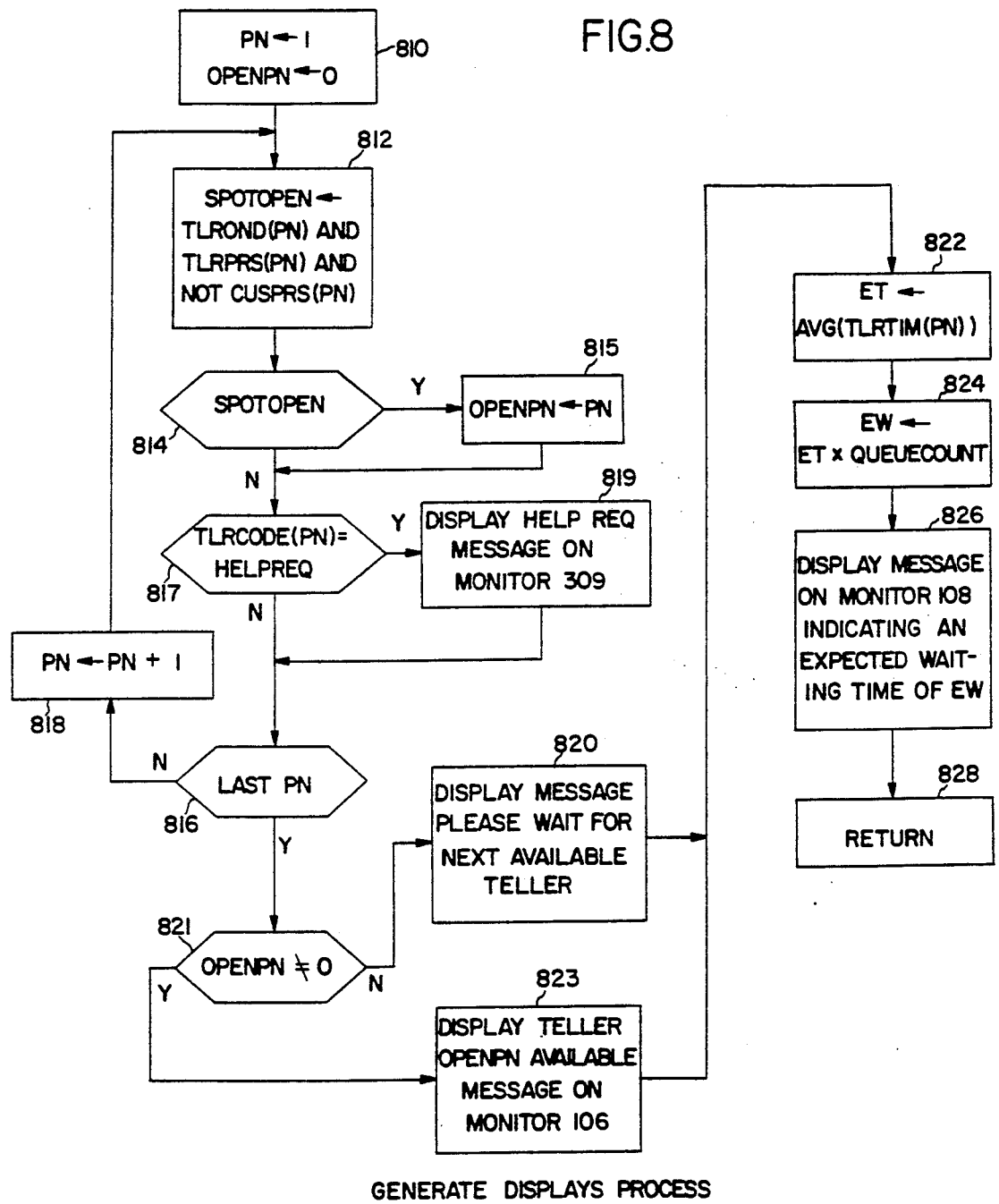
FIG. 8 GENERATE DISPLAYS PROCESS

APPARATUS AND A METHOD FOR SENSING EVENTS FROM A REMOTE LOCATION

BACKGROUND

The present invention is in the field of electronic sensors and is specifically directed to apparatus and a method for sensing events from a remote location using a time sequence of images of an area in which the events occur.

Sensing the presence or absence of a person or an object at a specified location is a problem which occurs in many fields. In the field of security, for example, it may be desirable to know whether an individual has entered a restricted area or whether a guard who is supposed to be covering the area is in a proper position to do so.

In commercial fields, such as banking, it may be desirable to know how many tellers are on duty, how many customers are waiting to be served by the tellers and the average amount of time customers are spending with each teller. Information of this type is useful for employee scheduling and for informing customers, who are entering the bank, of how long they can expect to wait.

In an office environment, it may be desirable to know when a worker starts and completes a task or to gather data on tasks being performed by a large number of workers.

Currently, problems of this type are addressed in one of two ways. In security systems, frame based video motion detectors are often employed to sound an alarm when motion is detected in or near a restricted area. An exemplary system of this type is described in U.S. Pat. No. 4,737,847 entitled "ABNORMALITY SUPERVISING SYSTEM." The apparatus described in this reference monitors changes in luminance in a video image from frame to frame to detect motion in a monitored area. The monitored area can be divided into subareas having different alarm levels. Detected motion in one subarea, for example, on a sidewalk outside of a building can be ignored while motion in another subarea, for example, near a ground-floor window of the building, can cause an audible alarm to be sounded. In this patent, the various subareas are defined by an operator using a light-pen on a reference image.

While a system of this type may be suitable for surveillance applications, it is not appropriate for commercial applications due to the large amount of image data which would need to be processed. Accordingly, other types of systems have been used in commercial environments. One type of system, manufactured by Camtron, Inc. is designed for use in a banking environment. This system uses a network of sensors, including ultrasonic motion detectors, light-photodiode combinations and manually operated switches to determine if a teller is present at each teller's station, if a customer is present in front of the teller's station and the length of the queue of customers waiting to be served.

A system of this type may be subject to errors causing it to give inaccurate data. For example, if the fact that a teller is at his station is indicated to the system by the teller turning on a switch, and the teller forgets to turn off the switch when he or she leaves, the system may erroneously believe that the teller's station is still occupied. Also, the number of customers in the queue may be miscounted if this number is determined by counting the number of times that a beam of light directed at a photodiode is interrupted. This count may be inaccurate if, for example, a person crosses the beam more than once or if the interruptions caused by two people overlap so that only one interruption is counted.

SUMMARY OF THE INVENTION

The present invention is embodied in a remote sensing system which uses an electronic image of an area to be monitored to detect the presence of objects and the occurrence of events in selected sub-areas of the area being monitored. To detect the presence of an object in a defined sub-area, the system includes circuitry which extracts data corresponding to the sub-area from the main image and compares this data to reference data representing the sub-area when no object is present.

According to a further aspect of the invention, the system includes circuitry which analyzes the extracted data for characteristics which would define a particular type of object.

According to another aspect of the invention, the system includes circuitry which compares the extracted data to corresponding data extracted in a prior time interval to determine the presence and direction of motion in the defined sub-area.

According to yet another aspect of the invention, the system includes a video camera which develops a video image. When the defined sub-area includes a light source, the system may sense different brightness levels produced by the light source as an information-bearing signal.

BRIEF DESCRIPTION OF THE DRAWINGS

FIGS. 2b1 and 2b2 are alternative top plan views of the waiting line shown in FIG. 1.

FIGS. 4, 5A-5C, 6A-6D, 6E1-6E3,7, and are flowchart diagrams which are useful for describing the operation of the data gathering system shown in FIG. 1.

DETAILED DESCRIPTION OF THE EXEMPLARY EMBODIMENTS OF THE INVENTION

Overview

Figure 1:
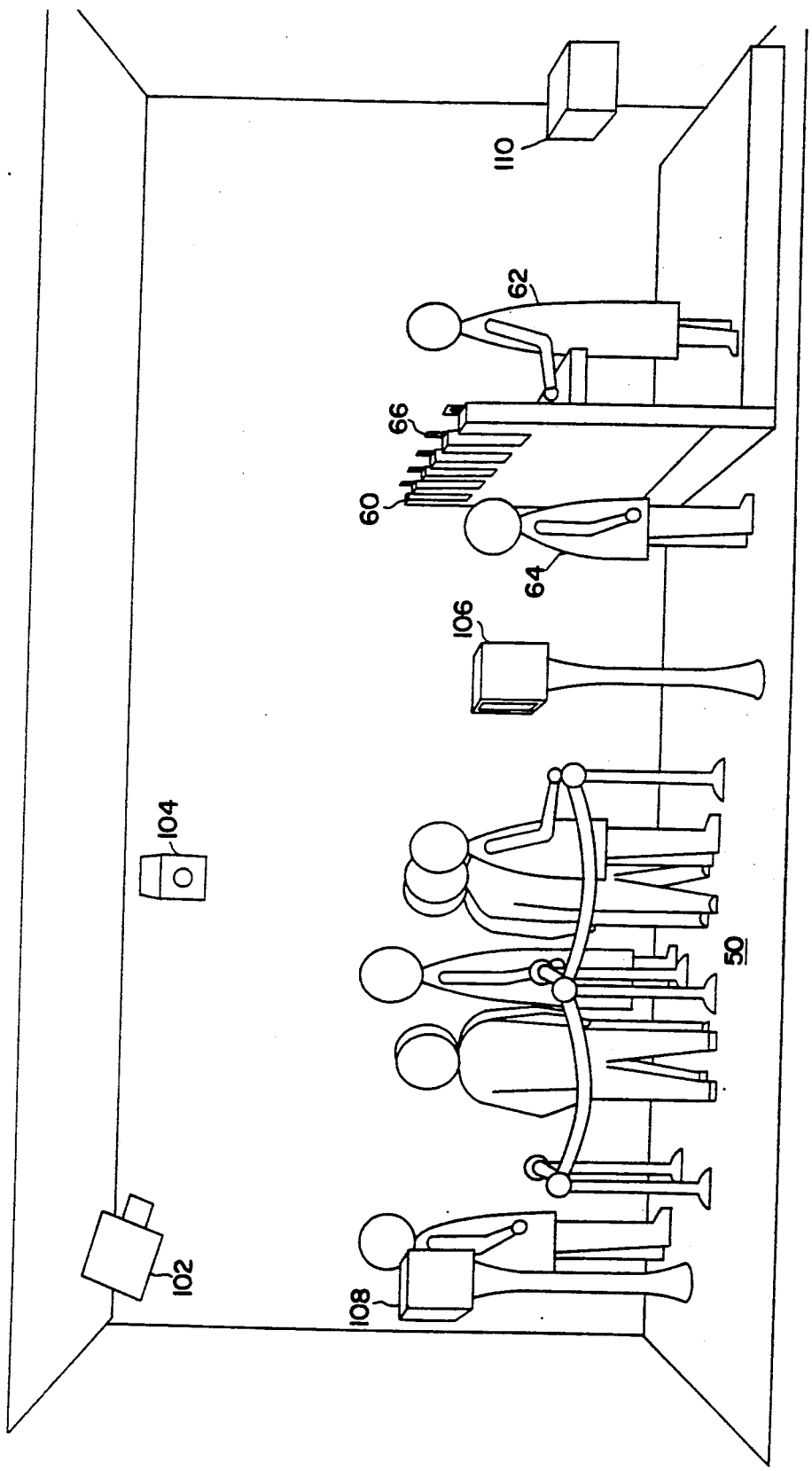
FIG. 1 is a perspective drawing of a bank lobby which includes an embodiment of a data gathering system in accordance with the present invention.

FIG. 1 illustrates a bank lobby in which a teller 62 is serving a customer 64. Several other customers are waiting in a queue 50 to be served. The bank includes an information gathering system which gathers data on the performance of the tellers and the volume of business transactions using video cameras 102 and 104.

In the exemplary data gathering system shown in FIG. 1 the images captured by the video cameras 102 and 104 are processed by a computer 110. From the video images, the system collects data on teller availability, teller efficiency and queue length. This data may be used, for example, to plan staffing levels or to anticipate peak customer demand. In addition, the exemplary system includes three video display monitors 106, 108 and 309. The monitor 106 is used to indicate available teller positions to the customers waiting in the queue 50 and the monitor 108 is used to inform customers just entering the bank of the expected waiting time in the queue 50 The monitor 309 (not shown in this FIGURE) is used as the operator interface to the computer system 110.

The information gathering system uses images obtained by the camera 102 to determine which tellers are on-duty, occupying their stations and currently serving customers. The images obtained from both cameras 102 and 104 are used to determine the number of customers waiting in the queue 50.

All of these monitoring functions may be performed by manipulating data in sub-areas of the images produced by the cameras 102 and 104. For example, the presence or absence of a customer at a teller station may determined by examining a rectangular portion of the image which would include a portion of the torso of a customer standing directly in front of the teller station. Similar sub-areas may be defined to determine which tellers are on-duty and which tellers are present at their stations. The queue 50 may be monitored by defining one or more sub-areas at the queue entrance and at the queue exit. Motion across these areas moving into the queue adds to the number of people waiting in line while motion moving out of the queue subtracts. Another area which includes the locations of the three or four people at the head of the queue may be defined and monitored using blob analysis techniques to count the number of people currently waiting.

These sub-areas are effectively remote sensors which are polled by extracting data from the images developed by the cameras 102 and 104. Consequently, in the material that follows, the sub-areas are alternatively referred to as sensor areas.

Each of the sub-areas are defined when the bank is empty. In the exemplary embodiment of the invention described below, the computer 110 is operated in a set-up mode to prompt the user to outline each sub-area, for example, by using a point light source. By analyzing the images captured in response to these prompts, the computer 110 defines rectangular arrays of pixel data which correspond to each sub-area. As a last step in the initialization process, the computer 110 extracts reference data for each sub-area, from images captured when the bank is empty.

In operation, the computer 110 periodically captures images from the cameras 102 and 104. It then extracts the pixel data corresponding to each of the defined sub-areas and compares this data to the reference data derived from the images of the empty bank. For the teller on-duty lights, for example, the sub-areas of the image defined as containing each of the on-duty lights are examined. Any of these areas containing pixel values representing a bright light cause a corresponding indicator to be set indicating that the teller associated with that light is on-duty. For each sub-area which may be occupied by a person, the sub-area data obtained from the image is compared to the reference data for the sub-area. If the differences between the current data and the reference data are greater than a threshold value, and if the differences between the images have characteristics, such as size, shape and motion, which are consistent with a person standing in the location, then the computer 110 records that the position is occupied.

To monitor the queue entrance and queue exit, the computer 110 uses the image provided by camera 104. From this image, the computer 110 first determines the difference in the sub-area pixels corresponding to the queue entrance and queue exit. Next the computer and compares these difference values to difference values were obtained from the previous scan by camera 104. From these two images, the computer 110 determines if a person is crossing either the entrance or the exit and whether he is entering or leaving the queue.

Data from both cameras is analyzed at one-half second intervals. Any change in the state of the data from one interval to the next causes the computer 110 to update the state of the system. For example, if, during the previous time interval, a person was detected crossing the queue exit and leaving the queue 50, and, if, during the current time interval, the image of the queue exit matches the reference image, then the internal variable representing the number of persons in the queue 50 is decremented by one.

In the exemplary embodiment of the invention, the teller on-duty light may be pulsed at one second intervals to request assistance. These pulses are detected as different values for the on-duty indicator for successive images captured by one or both of the cameras 102 and 104.

During each one-half second sampling interval, a change in state of the queue and teller counter causes the computer 110 to collect data on the change. For example, if the system determines, from its image analysis, that the customer 64 is no longer standing in front of the teller counter 60, the customer position is marked as available, if any customers are waiting in the queue 50, a message is displayed on the monitor 106 directing the next customer to the available teller. In addition, the elapsed time that the customer stood at the teller counter is averaged with service times for other customers to develop an average expected service time for all of the tellers currently on duty and for the particular teller that served the customer. Information is also collected on the average number of people waiting in the queue 50 at various times during the day for each day of the week.

The information on the expected service time for all of the on-duty tellers is used to update the display of the expected waiting time in the queue 50, presented on the monitor 108. The information on the expected service time for individual tellers and the number of people waiting in the queue 50 may be used by the bank for employee scheduling.

Detailed Description

Figure 2A:
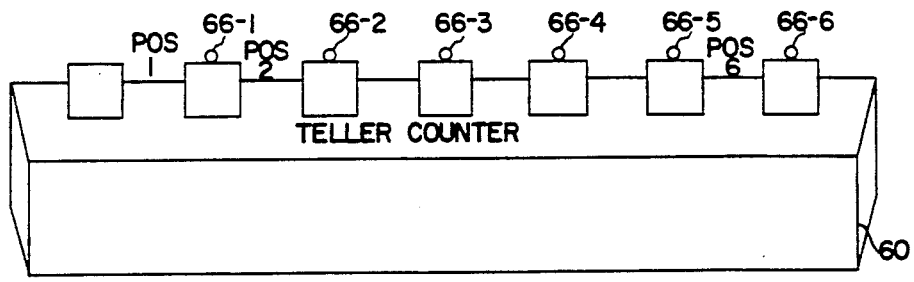
FIG. 2a is a wide-angle perspective drawing representing the image of the teller counter as captured by the data gathering system shown in FIG. 1.

FIG. 2a is a wide-angle perspective drawing of the teller counter 60 shown in FIG. 1. This is an exemplary image that may be captured by the camera 102, used in this embodiment of the invention. As set forth below in reference to FIGS. 2c and 5a, sub-areas of the image are defined for each of the six teller positions, for each corresponding customer position and for each of the on-duty lamps 66-1 through 66-6. Although they are shown as lamps in the exemplary embodiment of the invention, it is contemplated that the on-duty indicators may be replaced by a card having, for example, the word "open" on a white background on one side and the word "closed" on a black background on the other side. In this alternative embodiment, the relative brightness of the card would be sensed to indicate whether the teller is on-duty.

In operation, the computer 110 extracts pixel data from the defined sub-areas, compares this data with the corresponding data from the image of the empty bank and determines whether people are present at each of the defined teller positions, whether customers are waiting at each of the defined customer positions and whether each of the teller positions has its on-duty lamp lit.

Although the exemplary embodiment of the invention monitors six teller stations, it is contemplated that a larger number of stations, for example 20, may be monitored in a practical system.

FIG. 2b1 shows the queue 50 with exemplary entrance (210), exit (220) and queue head (230) sub-areas outlined in phantom. The entrance and exit sub-areas are monitored by the camera 104 while the queue-head sub-area is monitored by the camera 102. FIG. 2b2 shows an alternative configuration for the queue 50 in which the entrance sensor area 210 is replaced by four sensor areas 210A through 210D and the exit sensor area 220 is replaced by four sensor areas 220A through 220D. In this alternative embodiment, motion into and out of the queue is detected as correlated motion across the four areas at the queue entrance or the four areas at the queue exit.

Figure 2C:
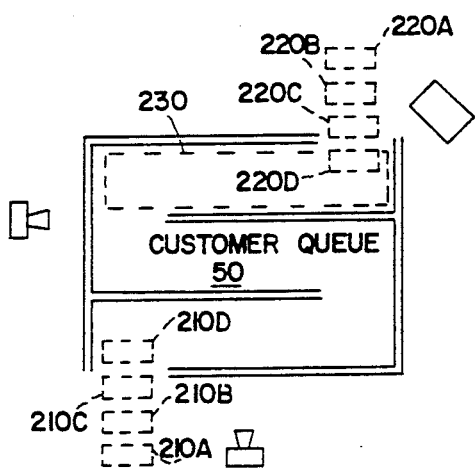
FIG. 2c is a front plan view of one of the teller stations shown in FIG. 1.
Figure 2C:
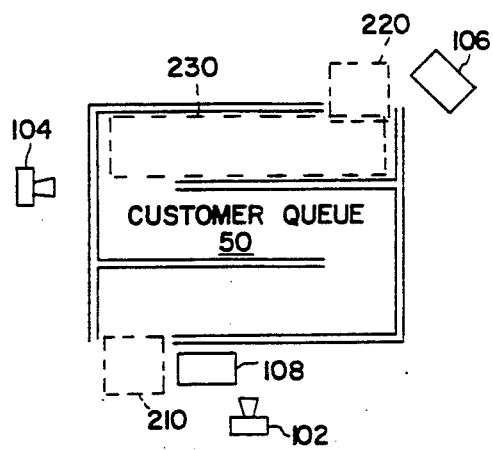
Figure 2C:
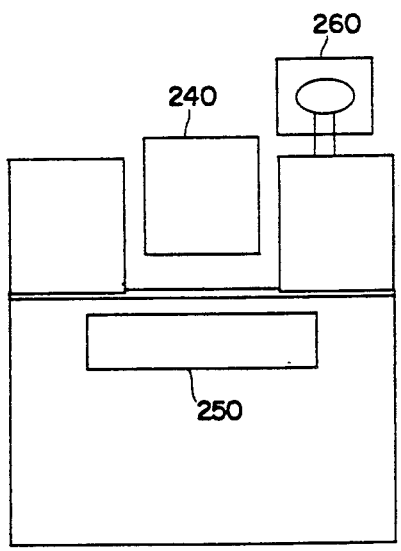

FIG. 2c is a magnified view of one of the six teller stations shown in FIG. 2a. The phantom outlines 240, 250 and 260 illustrate respective sub-areas for the teller position, customer position and teller on-duty lamp.

Figure 3:
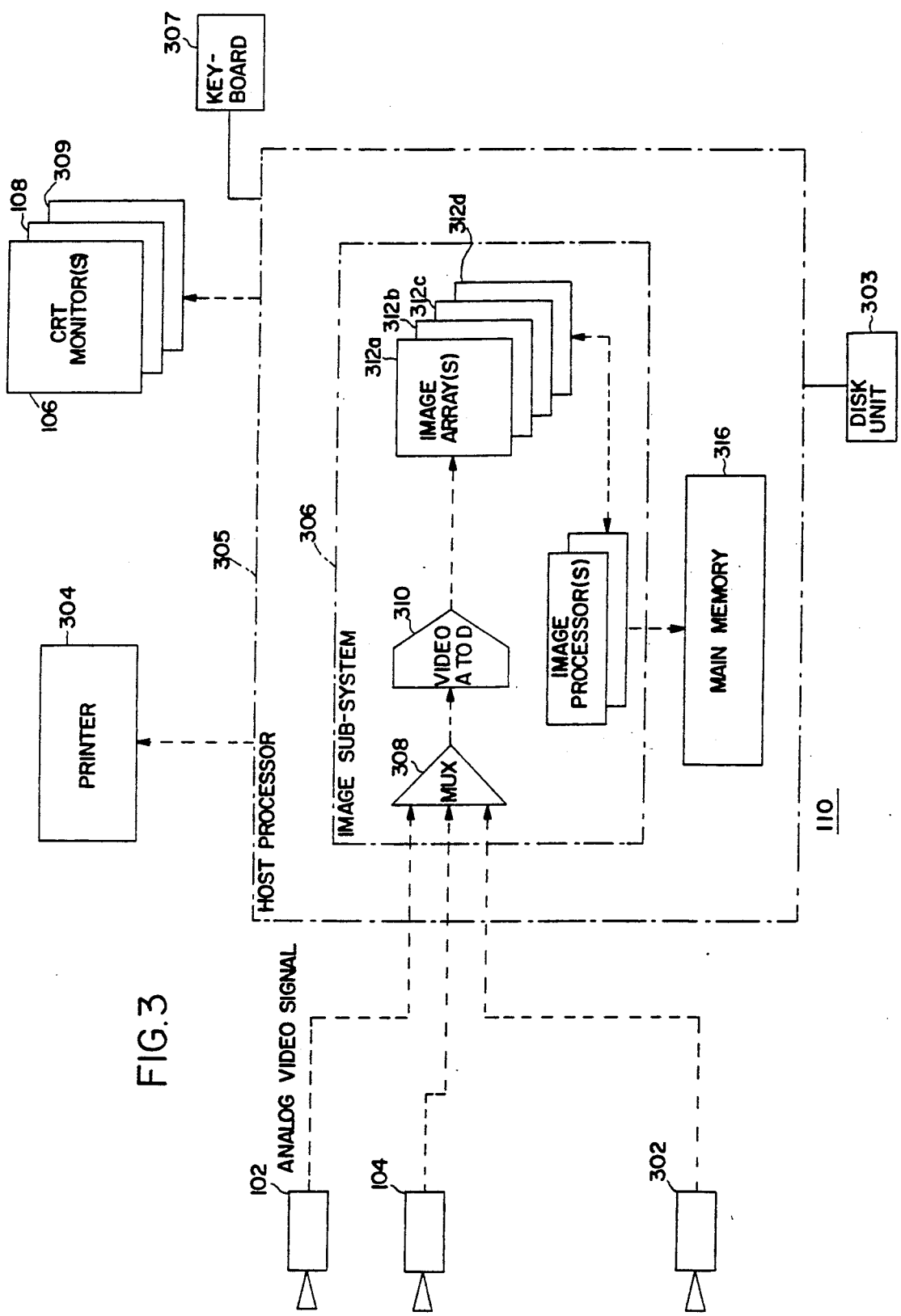
FIG. 3 is a block diagram which illustrates the functional connectivity of the data gathering system shown in FIG. 1.

FIG. 3 is a block diagram which illustrates the signal flow among the cameras 102 and 104, the computer 110, the CRT monitors 106, 108 and 309 and a printer 304. The monitor 309 is used in the exemplary embodiment of the invention to display messages and data requested by the operator. This monitor is desirably located in close proximity to the keyboard 307. Alternatively, it is contemplated that the monitor 309 may be omitted and one or both of the monitors 106 and 108 may be used as the operator display terminal.

As shown in FIG. 3, cameras 102 and 104 and an optional third camera 302 provide analog video signals to the computer 110. Although the monitoring system described below uses only two cameras, the optional camera 302 is shown to indicate that a larger number of cameras may be used. The number of cameras used is limited by the capability of the computer system 110 to capture and process the data provided by the cameras.

The cameras 102, 104 and 302 used in this embodiment of the invention are standard monochrome video cameras. It is contemplated, however, that color video cameras, infra-red cameras or other types of imaging sensors may be used for one or more of the cameras 102, 103 and 302.

In the exemplary embodiment of the invention, these video signals are provided to an image sub-system, such as the IV80 Image Processing System available from Sharp Electronics, Inc. or the MTM-PC image processing system used in conjunction with the TFG frame grabber, both available from Paracom, Inc. Both of these systems are designed to be used with a computer system which is compatible with the IBM PC ™ line of computers. Thus, in the Exemplary embodiment of the invention, the host processor 305 is a computer which is compatible with the IBM AT ™ computer system.

In the exemplary computer system, analog video signals from the cameras 102 and 104 and, optionally camera 302 are applied to a multiplexer 308 of the image subsystem 306. The multiplexer 308 is responsive to signals (not shown) provided by the host processor 305 to switch between the signals provided by the various cameras such that a new image is obtained from each camera at one-half second intervals. In this embodiment of the invention, the scanning rates of all of the cameras 102, 104 and 302 are synchronized by a gen-lock signal (not shown) provided by the image subsystem 306. The gen-lock signal defines the horizontal and vertical scanning signals for the cameras 102, 104 and 302. This signals synchronizes all of the video cameras so that the multiplexer 308 may successively provide signals representing individual image frames from each of the cameras.

The output signal of the multiplexer 308 is applied to a video analog-to-digital converter (ADC) 310. The ADC 310 samples the video signal provided by the multiplexer 308 to develop digital values representing the amplitude of the signal at intervals defined by a sampling clock signal (not shown) generated by the image subsystem 306. In the exemplary embodiment the sampling clock signal is synchronized to the gen-lock signal so that the same number of digital samples are generated during each horizontal line interval of each video signal. Because of this synchronization, an individual sample, identified by its line number and sample number within the line, corresponds to substantially the same position in the image from frame to frame.

The entire image frame from the video signal currently being provided by the multiplexer 308 is digitized by the ADC 310 and stored in the image arrays 312a through 312d. The reference images, captured by each of the cameras 102, 104 and 302 when the bank is empty, are also stored in the image arrays 312a through 312d. In the exemplary embodiment of the invention, this image is stored as pixel values from the respective groups of defined sub-areas. It is contemplated, however, that an entire reference image for each camera may be stored in a respective one of the image arrays 312a through 312d. In addition, the image arrays 312a through 312d may hold processed image data, such as image difference values provided by an image processor 314.

The image processor 314 may access any of the arrays 312a through 312d to process the pixel data from the various images. In the standard mode of processing data from camera 102, the pixel data from the reference image is subtracted from the corresponding data of the most recently captured image. The resulting pixel difference values may be provided to the main memory 316 of the host processor 305. Alternatively, or in addition, these frame difference images may be stored into a portion of one or more of the image arrays 312a through 312d.

In the standard mode of processing data from camera 104, the reference image data is subtracted from the current image data to develop current image difference data. This data is subtracted from the stored image difference data, derived from the frame that was previously grabbed from camera 104. When this operation is complete, the current image difference data is stored in place of the stored image difference data and the data representing the difference between the two difference images is written into the main memory 316. The use of this data is described below with reference to FIGS. 6a through 7.

In addition to the image subsystem, the host processor 305 is coupled to the CRT monitors 106, 108 and 309 by standard video interface subsystems. In the exemplary embodiment of the invention, the monitors 106, 108 and 309 conform to the variable graphics adapter (VGA) standard defined by IBM corporation. Thus, the computer 305 includes at least one plug-in VGA subsystem card to which the monitors 106, 108 and 309 may be coupled.

In the exemplary embodiment of the invention, the host processor is also coupled to a disk unit 303. Unit 303 holds the various programs that control the operation of the computer 110 as well as data that defines the state of the system at any given time. This data includes information defining all of the sub-areas as well as any statistical data that may have been collected to-date. Pixel data for the reference images may also be stored in a file on the disk unit 303.

Finally, the exemplary host processor 305 is coupled to a printer 304 through a standard parallel port interface. The printer 304 is coupled to the system to allow the operator to obtain printed reports which may include, for example, statistical evaluations of the data, such as queue length, teller service time and customer waiting time, derived from the captured images.

Figure 4:
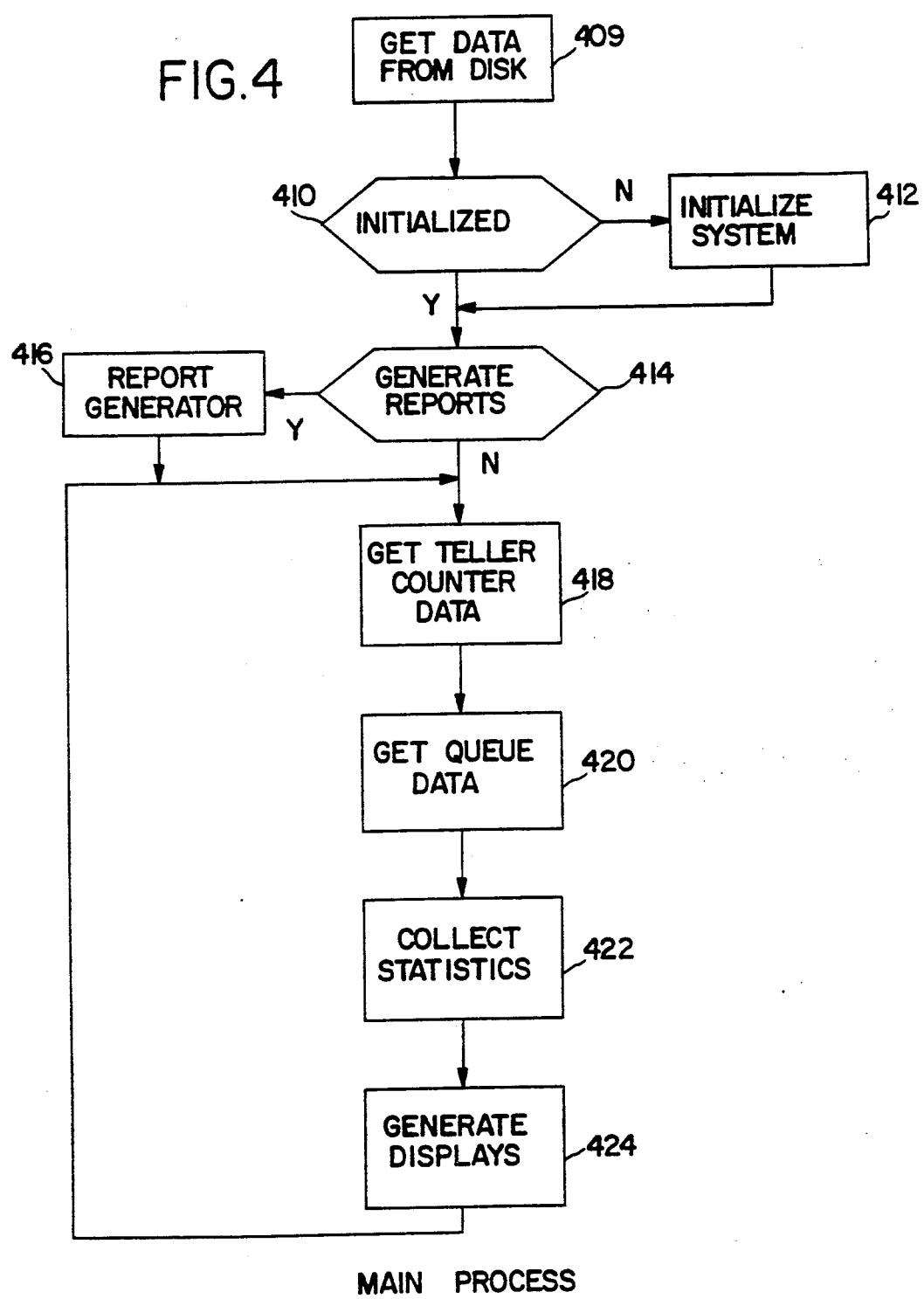

FIG. 4 is a flow-chart diagram which illustrates the main or host process which runs on the host processor 305. This FIGURE illustrates the outer loop of the process, each of the individual sub-processes is described in greater detail below with reference to FIGS. 5a-c, 6a-e3, 7 and 8.

The first step, 409, which is executed when the main process is invoked reads a system state file from the disk unit 303. This file holds the data on the previously defined sub-areas and on the statistical information that has been collected to date. At the next step, 410, the host processor 350 prompts the operator to determine if the system needs to be initialized.

If, at step 409, no system state file was found on the disk unit 303, step 410 assumes that the system has not been initialized. If the operator response or the results of step 409 indicate that the system needs to be initialized, the initialization process is invoked at step 412. This process is described below in reference to FIGS. 5a through 5c. If, at step 410 it is determined that the system does not need to be initialized, the data retrieved in step 409 is used to define the state of the system.

Step 414 is executed after step 412 or after step 410 if the system does not need to be initialized. This step asks the operator if he wants to generate reports from the collected statistical data. If the operator answers yes, a report generator is invoked at step 416. The report generator need not be a customized program. A commercially available report generator, such as the report generation facility in the dBase IV ™ computer program available from Ashton Tate Inc. may be invoked at step 416. Consequently, the report generator is not described in detail.

After the reports have been generated or, if, at step 414, the operator indicates that no reports are to be generated the main loop of the main process is invoked. The first step in this loop, step 418, uses images grabbed by camera 102 to determine the status of the teller counter sensors. This process, which is described below in reference to FIGS. 6a through 6c, determines which tellers are on-duty and present at their stations and which customer positions are occupied.

Next, step 420 is executed which uses the images grabbed by cameras 102 and 104 to update the status of the queue. The queue data process, which is described below in reference to FIGS. 6d through 6e3, updates and verifies the number of people waiting in the queue 50.

The next step in the process, step 422, uses the data generated in steps 418 and 420 to update the statistical information that is being collected by the system. The process which implements this step may be quite involved depending on the type and number of statistics which are collected. These may be different for each installation. An exemplary process which gathers statistics on teller efficiency is described below with reference to FIG. 7.

The final step in the loop, step 424, uses the data gathered in steps 418 and 420 and the statistics collected in step 422 to generate the displays for the monitors 106, 108 and 309. The process which implements this step is described below in reference to FIG. 8. After step 424, the main loop branches back to step 418. This process continues until the main loop is interrupted.

The flow-chart diagram in FIG. 5a illustrates the initialization process. The first step in the process, step 502, asks the operator if the cameras need to be aligned. If the operator answers yes, step 504 grabs images from the cameras 102 and 104 and displays the images on the monitor 309. If sensor areas have been defined, they are displayed as blanked areas in the respective images. At step 506, a message is displayed on the monitor 309, superimposed on the image, which asks the operator to indicate when the cameras are aligned. As long as the operator does not so indicate, step 506 transfers control to step 504 to grab the next images from the cameras 102 and 104. During this interval, the operator may move the cameras 102 and 104 so that the various sensor areas appear in the appropriate images or so that the defined sensor areas are properly aligned in the respective images.

Once the images provided by the cameras 102 and 104 are aligned, or, if at step 502 it is determined that no alignment is needed, control passes to step 508. At this step, the operator is asked if he wants to define the sensor areas for the teller counter. If the answer is yes, step 510 invokes a process which sets up the teller counter sensor areas. This process is described below in reference to FIG. 5b.

After step 510, or if the answer at step 508 is no, step 512 is executed. In this step, the operator is asked if he wants to define the sensor areas for the queue. If he answers yes, step 514 is executed to set up the queue sensor areas. This step is described below in reference to FIG. 5c.

After step 514, or if the answer at step 512 is no, step 522 is executed. At this step, the host processor asks the operator if he wants to capture an image of the empty bank. If the answer is yes, step 524 is executed which asks the operator whether he wants multiple timed images or a single image. In many installations, a single image is sufficient since the lighting in the bank is fairly constant throughout the business day. However, when the bank in which the system is installed has significant outside lighting, it may be desirable to store multiple images, for example, one per hour. If the user requests multiple images, the host processor 305, at step 528, requests the operator to enter times and dates at which the multiple images are to be captured. In the exemplary embodiment of the invention, each separate entry in this list causes the host processor 305 to be interrupted at the respective time and date. In response to this interrupt, the processor conditions the image subsystem 306 to capture the image of the bank from both cameras 102 and 104. These images are stored on the disk unit 303.

If, at step 524, the operator requests that only a single image be obtained, step 526 is executed. In this step, the host processor 305 conditions the image subsystem 306 to capture the current images from the cameras 102 and 104 as the empty bank images. These images are also stored on the disk unit 303. After step 526 or 528, or, if the answer at step 522 is no, control is returned to the main process.

When multiple images of the empty bank have been stored on the disk unit 303, the main process, shown in FIG. 4 may be periodically interrupted (not shown) to change the reference image. This interrupt would be a simple timer interrupt which may condition the host processor 305 to replace the reference images currently held in the image arrays 312a through 312d with the stored image data having a time-stamp that most closely matches the current value of the system clock.

Figure 5B:
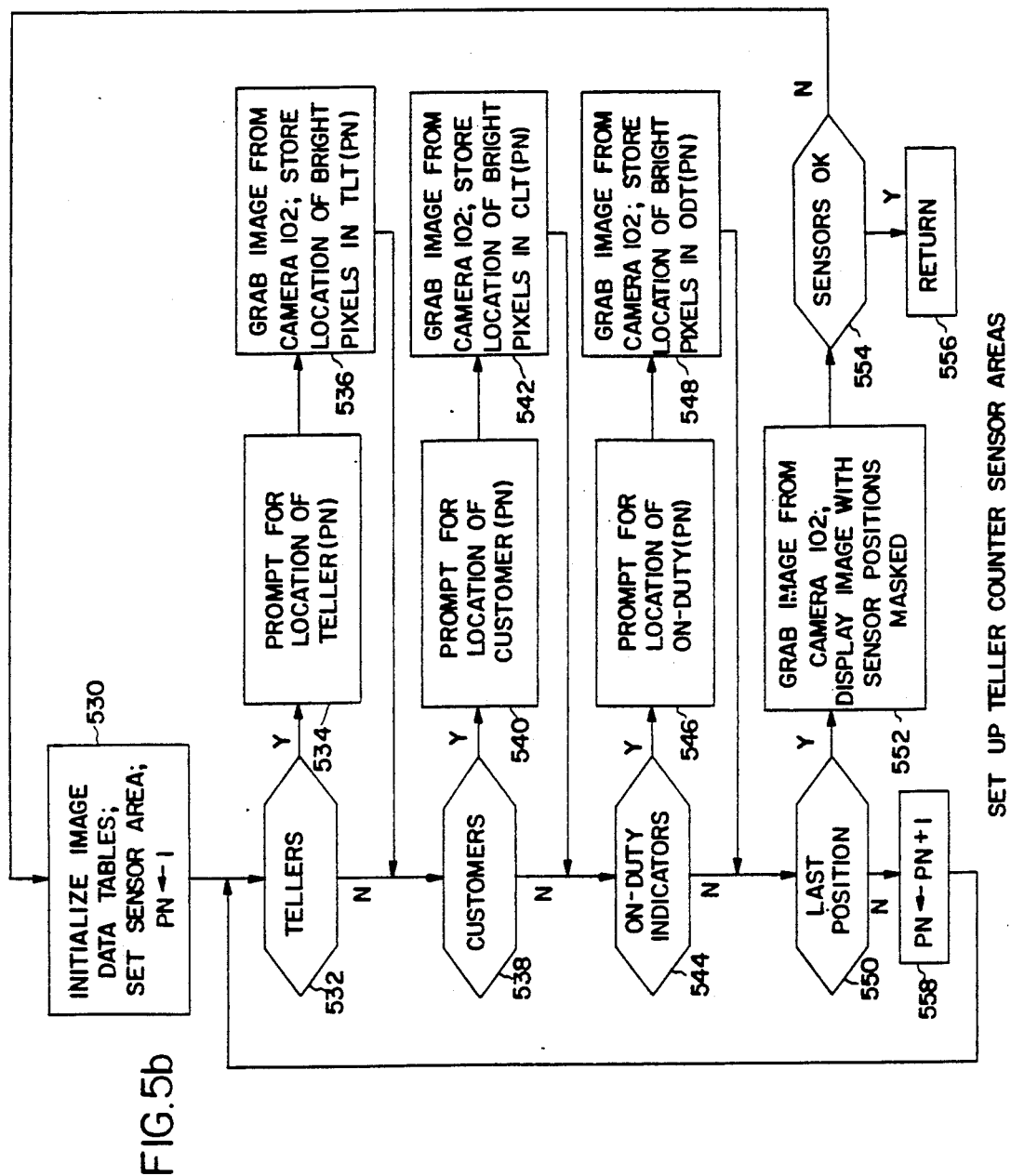

The process by which the teller counter sensor areas are initialized is shown in FIG. 5b. The first step in this process, step 530, initializes the image data tables. This may include, for example, asking the operator to specify the number of teller positions and setting up a group of data structures for each position. In addition to holding the sensor area data, these data structures may hold information identifying the teller at the teller position and information on the teller's performance.

At step 530, the programmed host processor 305, in the exemplary embodiment of the invention, may also ask the operator to specify a fixed area for each type of teller counter sensor area, each area being defined as a horizontal distance and a vertical distance. When the sensor areas are defined, the operator indicates the center of each area to the camera 102. The host computer 305 converts the distance measurements for the defined area into respective numbers of pixels and defines the sensor area as a rectangular block of pixels centered about the specified center point. In the exemplary embodiment, the conversion factors between horizontal and vertical distances on the one hand and pixel positions on the other hand are entered by the operator. These conversion factors may also be automatically computed based on the distance between the camera and the teller counter, the angle at which the camera is mounted and the focal length of the lens.

This is only one method of specifying a sensor area, another method, in which the corners of each sensor area are specified, is described below in reference to FIG. 5c.

The last sub-step of step 530 sets the variable PN to have a value of one. The name PN is a mnemonic for Position Number. This variable is used as an index to sequentially select each of the teller position data structures for initialization.

In the next step, 532, the host processor 305 asks the operator if the teller positions are to be initialized. If they are, the host processor, at step 534, prompts the operator to indicate the position of teller location PN. The operator then places a bright light source in the center of the appropriate teller position, i.e. in the center of the square 240 of FIG. 2c. When the light is in position, step 536 is executed in which the image subsystem 306 grabs an image from camera 102; determines the position in the image of the digitized pixels which have values consistent with a bright light; and stores that position in TLT(PN), the Teller Location Table entry for that position number.

Steps 538, 540 and 542 operate in the same manner to obtain the customer location (i.e. the center of the rectangle 250 of FIG. 2c) for the position number PN.

Steps 544, 546 and 548 operate in much the same manner to obtain the location of the on-duty lamps. The only difference in the procedure is that, instead of placing a bright light in the center of the on-duty sensor area, the operator merely turns on the appropriate on-duty lamp.

After step 548 or, if the on-duty sensor areas do not need to be initialized at step 544, step 550 is executed. This step compares the value held by PN to the largest position number. If PN is less than the largest position number, step 558 increments PN and transfers control to step 532 to set up the sensor areas for the next teller position.

If, at step 550, the last teller position has been evaluated, step 552 is executed. In the exemplary embodiment of the invention, this step grabs the current image from camera 102, blanks the areas of the image that correspond to the defined sensor areas and displays the result on the monitor 309. At step 554, the host processor 305 displays a message, superimposed on the image displayed on the monitor 309 asking the operator if the sensor areas are acceptable. If not, control is transferred to step 530 to reinitialize the erroneous sensor areas. Otherwise, step 556 is executed which returns control to the initialization process, shown in FIG. 5a.

FIG. 5c is a flow-chart diagram which illustrates the process by which the queue sensor areas are initialized. This process is invoked at step 514 of the initialization process, described above with reference to FIG. 5a.

The queue sensor areas are defined in a different manner than is used for the counter sensor areas. The queue sensor areas are defined by specifying maximum and minimum horizontal and vertical pixel addresses in the images captured by the cameras 102 and 104. As described above, the counter sensor areas, in this embodiment of the invention, are defined by specifying a template for the area and then centering the template on the image. It is contemplated that either one of these methods may be used exclusively or that either method may be used selectively for each type of sensor area.

The first step in the process shown in FIG. 5c, step 560, initializes the image data table entries for the queue sensor areas. This may involve, for example, resetting each of the maximum boundary values to zero and setting each of the minimum X coordinate boundary value to the largest pixel number and the minimum Y coordinate boundary value to the largest line number in the image. Alternatively, the operator may be prompted (not shown) to specify which areas he wants to have reset.

Next, at step 562, the operator is prompted to provide the location of the queue exit. In response to this prompt, the operator moves a bright light around in the area to be defined as the queue exit sensor area, i.e. the area 220 of FIG. 2b1 or each of the sensor areas 220A through 220D of FIG. 2b2. At step 564, the image subsystem 306 and host processor 305 continually grab images from camera 104, locate the center pixel coordinates (XC, YC) of the bright light source in the image and compare the XC value to the maximum and minimum X coordinates (XMAX and XMIN). If XC is less than XMIN or greater than XMAX, the XC value replaces the respective XMIN or XMAX value. In the same manner, if YC is less than YMIN or greater than YMAX, it replaces the respective YMIN or YMAX value.

When, at step 566, the operator indicates that the queue exit has been defined, control is transferred to step 568 in which the values of XMIN, XMAX, YMIN and YMAX are stored in the image data table entry for the queue exit. Also at step 568, the operator is prompted to provide the location of the queue entrance. In response to this prompt, the operator moves the bright light source around the area 210, shown in FIG. 2b1, or the areas 210A through 210D shown in FIG. 2b2. at step 570, the queue initialization process gets the maximum and minimum X and Y coordinate values which define the queue entrance sensor area. When, at step 572, the operator indicates that the entrance sensor area has been adequately defined, step 574 is executed. This step stores the coordinate values in the image data table entry for the queue entrance and prompts the operator to specify the location of the queue head.

At step 576, the image subsystem 306 and host processor 305 continually grab images from camera 102 and capture the maximum X coordinate and Y coordinate excursions of the bright light as the limiting coordinates of the queue head sensor area. This is the area 230 of FIGS. 2b1 and 2b2.

When, at step 578, the operator indicates that the queue head has been defined, step 580 is executed. This step stores the defined boundary coordinates in the image data table entry for the queue head sensor area and displays the queue entrance and queue exit sensor areas on an image grabbed from camera 104 and the queue head sensor area on an image grabbed from camera 102. In the exemplary embodiment, these images are displayed on the monitor 309.

At step 582, the operator is asked if the sensor areas are acceptable. If not, control is transferred to step 560 to reinitialize the queue sensor areas. Otherwise, step 584 is executed which returns control to the initialization process.

Figure 6A:
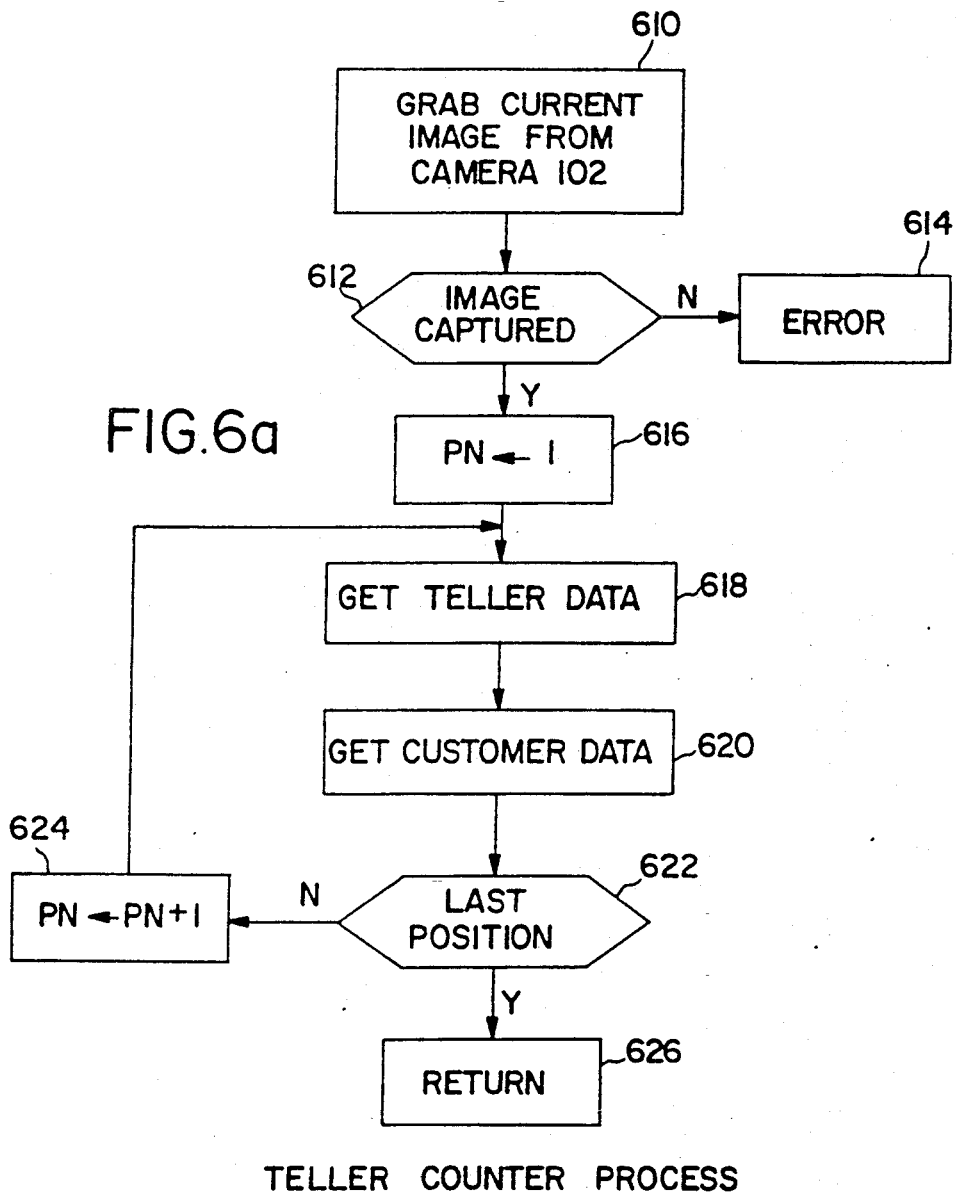

After the initialization process is complete, the main process, shown in FIG. 4, enters a loop in which data from the teller counter and queue sensor areas are continually gathered, statistics are collected and the displays for the monitors 106, 108 and 309 are generated. FIGS. 6a through 6c illustrate the process by which data is acquired from the teller counter sensor areas. FIGS. 6d and 6e1 through 6e3 illustrate alternative processes by which the queue data is acquired from the queue configurations shown in FIGS. 2b1 and 2b2, respectively.

In the first step shown in FIG. 6a, step 610, the image subsystem 306 grabs the current image from camera 102 and stores the image in one of the image arrays 312a through 312d. At step 612, the host processor 305 checks the appropriate image array. If the image has not been captured, an error message is generated at step 614. In the exemplary embodiment of the invention, this message is displayed on the monitor 309.

If the image has been captured at step 612, step 616 is executed which sets the position number variable PN to one. Steps 618, 620, 622 and 624 constitute a loop in which the teller and customer data are obtained for each defined teller position. When the last teller position has been evaluated, the host processor 305 exits the loop at step 622 and, at step 626, control is returned to the main process. The respective processes which obtain the data for the teller and customer sensor areas are described below in reference to FIGS. 6b and 6c.

In the first step in the process shown in FIG. 6b, step 630, the host processor 305 examines the pixel data at the image position indicated by ODT(PN). This image was captured from camera 102 at step 610 of FIG. 6a. This data is the sensor area for the on-duty lamp of the teller position PN. If, at step 632, no values representing bright light are detected among these pixel values, step 634 is executed which sets the teller on duty indicator for the teller position, TLROND(PN), to zero and, at step 636, returns control to the get counter data process, shown in FIG. 6a.

If, however, pixel values representing bright light are detected at step 632, step 638 is executed which sets TLROND(PN) to one. Next, at step 640, the image subsystem 306 extracts the image data at the location TLT(PN), the teller location for the position number PN. The subsystem 306 then generates the difference between stored reference image at the location TLT(PN) and the extracted data from the current image. If, at step 642, all of the difference values are less than a programmed threshold value, the image indicates that the teller is not present. In this instance, the host processor 305, at step 644, sets the teller present indicator, TLRPRS(PN) to zero and, at step 652, returns control to the teller counter process shown in FIG. 6a.

If, at step 642, a sufficient number of the difference values are found to be greater than or equal to the threshold value, step 646 is executed. At this step, the host processor 305 invokes blob analysis algorithms (not shown) to determine if the difference values detected at the teller position PN have human qualities. Blob analysis techniques are well known in the art, Exemplary measurements that may be made may include correlating the difference pixel values to values representing various parts of a model human form, corrected for the angle of the camera. A strong correlation with, for example, a portion of the form representing the head and shoulders would be a good indication that the teller position is occupied.

In addition to stationary blob analysis techniques, the data at the teller position TLT(PN) may be analyzed for motion consistent with that of a human being. To this end, the previous difference value for each teller position PN may be stored in one of the image arrays 312a-d. If the two difference images are subtracted, the resulting pixel values, if they are greater than a threshold value, indicate motion in the portion of the image. Conventional digital filtering techniques may be applied to the motion indication signals, by the host processor 305, to determine the frequency characteristics of the detected motion.

The threshold value compensates for minor changes in lighting that may occur at different times during the day and for accumulated dirt or litter which may be at different levels at different times during the day. A further discussion of blob analysis techniques such as edge enhancement, contour following, moments of inertia, morphological features and chain codes is contained in books by Gonzalez et al. entitled *Digital Image Processing,* 2nd Ed., Addison-Wesley; by Ballard et al. entitled *Computer Vision,* Prentice Hall; and by Baxes entitled *Digital Image Processing—A Practical Primer,* Cascade Press, Denver, CO; which are hereby incorporated by reference for their teachings on the application of blob analysis techniques in digital image processing.

If, at step 648, the difference data generated at step 640 indicates that a person is present in the teller sensor area, step 650 is executed which sets the teller present indicator, TLRPRS(PN) to one. Otherwise, step 648 branches to step 644, described above. After either step 644 or 650, the host processor 305, at step 652, returns control to the teller counter process.

FIG. 6c illustrates the process which determines whether a customer is present in the customer sensor area, defined by the coordinates stored in CLT(PN). This process is the same as the process described above in reference to steps 640 through 652 of FIG. 6b except that CLT(PN) is used to define the sensor area and the present indicator is stored in CUSPRS(PN). Accordingly, this process does not need to be described in detail.

FIG. 6d illustrates the process which extracts data on the queue 50, as shown in FIG. 2b1, from the images provided by cameras 102 and 1104. This process is invoked at step 420 of FIG. 4, described above. At step 674 of FIG. 6d, the image subsystem 306 grabs the current image from camera 104 and extracts the pixel data corresponding to the defined queue entrance and queue exit sensor areas. Each of these data sets is subtracted from the corresponding data set from the reference image, which is stored in one of the image arrays 312a–d. These groups of difference values are compared to stored groups of difference values representing, respectively, the difference between the previous queue entrance and exit images and the corresponding reference images. Any difference between any two groups of corresponding difference values is indicative of motion in the associated sensor area.

The direction of the motion may be determined by analyzing the pixel values in the two difference images. If, for example, the later difference image has more pixel values that are below the threshold (i.e. pixel values that correspond to the empty bank image) on its right-hand side that does the previous difference image, the motion is most probably from right to left. The motion in each of the queue entrance and queue exit sensor areas is resolved into an indication of motion into the queue and motion out of the queue.

Since two areas are being monitored, each area could indicate either motion into or out of the queue. In the exemplary embodiment of the invention, variables MIE and MIX are set to one if motion is detected into the entrance or exit, respectively of the queue 50. Similarly, variables MOE and MOX are set to one if motion is detected out of the entrance or exit, respectively. Only one of MIE and MOE and one of MIX and MOX may have a non-zero value. If both MIE and MOE are zero or if both MIX and MOX are zero then either no motion was detected in the corresponding sensor area or the direction of the detected motion was neither into nor out of the queue 50.

At step 676, a variable, QUEUECOUNT representing the number of people waiting in the queue 50 is increased by the quantity MIE + MIX. At step 678, the variable QUEUECOUNT is decreased by the quantity MOE+MOX. At step 680, the difference between the current pixel data values for the queue entrance and queue exit are stored into the image arrays 312a–d, replacing the previously stored difference values.

At step 682, the host processor 305 determines if the value of QUEUECOUNT should be recalibrated. QUEUECOUNT is recalibrated every time it indicates that there are less then four people in the queue or when the operator has requested a recalibration. The operator may request a recalibration, for example, when there are fewer than four people in the queue but the display generated at step 424 indicates that there are more than four people in the queue. If step 682 determines that QUEUECOUNT does not need to be recalibrated, step 698 is executed which returns control to the main process, described above in reference to FIG. 4.

If step 682 determines that QUEUECOUNT is to be recalibrated, step 684 is executed. In this step, the host processor 305 extracts the queue head pixel data from the current image obtained from camera 102 and generates the difference between this extracted pixel data and the stored reference data for the queue head sensor area. At step 686, this data is analyzed to determine if the difference values are less than the preprogrammed threshold value. If the differences are less than the threshold, then the queue is empty. Accordingly, at step 696, QUEUECOUNT is set to zero and control is returned to the main process at step 698.

If, however, significant areas of the difference image have values greater than the threshold, step 688 is executed. This step performs blob analysis on the difference data to attempt to count the number of people in the queue. For this type of analysis, the image subsystem 306 may be programmed to correlate the entire queue head sensor area repeatedly with selected segments of the model human form which have been corrected for the angle of the camera image. A strong correlation indicating a number of distinct individuals can provide an accurate count of the number of people in the queue.

This number is stored into the variable QC at step 690. At steps 692 and 694, if the value QC is less than four, it is substituted for the value currently held by QUEUECOUNT. Otherwise, control is returned to the main process, via step 698. Only automatically determined queue count values less than four are currently deemed to be trustworthy by the inventors. Using higher quality images and/or more advanced image analysis techniques, it may be possible to accurately count larger numbers of people.

It is contemplated that the calibration methods described above may be extended to obtain a rough estimate of the number of people in the queue by comparing the image of the entire queue to a set of preprogrammed images of different queue lengths. Each of these preprogrammed images may be empirically associated with respective numbers of individuals in the queue. This rough count would then be used to calibrate QUEUECOUNT when the value held by QUEUECOUNT is clearly in error and the number of individuals in the queue is greater than four.

The flow-chart diagram shown in FIGS. 6e1 through 6e3 illustrates the method by which QUEUECOUNT is updated when the queue 50 has the configuration shown in FIG. 2b2. In this configuration, four distinct sensor areas (210A through 210D) are defined at the entrance to the queue and four more sensor areas (220A through 220D) are defined at the exit from the queue. A new entry into the queue is registered when a pattern of motion is detected into the queue area across either of the entrance or exit sensor areas. The steps shown in all of the flow-chart diagrams 6e1 through 6e3 replace the steps 674, 676, 678 and 680 of FIG. 6d. The remaining steps of FIG. 6d are valid for both configurations of the queue 50.

The first step in FIG. 6e1, step 902, grabs an image from camera 104, extracts the pixel data for the eight sensor areas 210A through 210D and 220A through 220D and then subtracts the empty image data for each sensor area from the extracted data to generate current difference data for the eight sensor areas. Step 902 also generates data representing the difference between the current difference data and stored difference data. This stored data is the difference data for the eight sensor areas generated during the previous time interval.

The values generated by this operation are compared to a threshold, at step 904, to determine if there is motion in each of the eight sensor areas. At step 904, the current difference data is stored in the memory 316, replacing the previously stored difference data.

In the exemplary embodiment of the invention, The indications of motion, derived from the current and stored difference data for each of the eight areas, are stored in separate one-bit storage locations (NAE, NBE, NCE and NDE for the queue entrance 210 and NAX, NBX, NCX and NDX for the queue exit 220). The previous values of each of these storage locations are stored in eight one-bit storage locations OAE though ODE and OAX through ODX, respectively.

Step 906 of FIG. 6e1 through step 972 of FIG. 6e3 describe operations performed by the computer 110 to increment or decrement the variable QUEUECOUNT. These steps include logical operations such as logical AND (symbolized by ·) and logical OR (symbolized by +). For the sake of simplicity, only the operations for the queue entrance 210 are described. The operations for the queue exit are identical.

In summary, the steps 906 through 972 detect when a person enters the queue by crossing the areas 210A through 210D in sequence; it also handles situations in which a person backs up before entering the queue and in which a person exits the queue from the entrance 210.

The first step in this process, step 906, sets a boolean variable ENTERA if there is currently an indication of motion in area 210A (NA is TRUE) while, previously, there was no indication of motion (OA is FALSE). At step 908, a test is made to determine if motion is currently detected in area 210B (NB is TRUE) while previously there was no indication of motion (OB is FALSE), and motion was previously, or is presently indicated for the area 210A (OA is TRUE or ENTERA is TRUE). If these conditions are met, step 910 is executed which resets the variable ENTERA and sets the variable ENTERB. This registers a person crossing from area 210A to area 210B.

Execution continues to the flow-chart diagram of FIG. 6e2 via the off-page connector A. In step 912 of FIG. 6e2, the process determines if a person has entered area 210C while the boolean variable ENTERB is set. That is, whether a person has moved from area 210B to area 210C. If so, step 914 is executed in which the variable ENTERB is reset and a variable ENTERC is set. Steps 916 and 918 perform the same operations, to reset the variable ENTERC and set the Variable ENTERD when a person moves from area 210C to area 210D.

Step 920 determines if a person left area 210D while the variable ENTERD was set. If so, then the person entered the queue from area 210D. Accordingly, at step 922, the variable ENTERD is reset and the variable QUEUECOUNT is incremented by 1.

Steps 924 through 936 handle situations in which a person partially traverses the areas 210A through 210D and then reverses his direction of travel, never entering the queue. Step 924 determines if the person has left area 210D (ND is false and OD is true) and entered area 210C (NC is true) while, previously, motion had been detected in area 210C (OC is true) and the variable ENTERC is reset. These conditions indicate that the person paused in area 210D and then moved to area 210C. If the conditions at step 924 are met, step 926 is executed which resets ENTERD and sets ENTERC. Steps 928, 930, 932 and 934 perform the same process steps, using different variables, when it is determined that a person has left area 210C for area 210B and/or has left area 210B for area 210A. The final step in the backup process, step 936, resets the variable ENTERA when there is no motion in area 210A (NA is false) while, previously, there was motion in area 210A (OA is true). Execution of this process continues to the steps shown in FIG. 6e3 via the offpage connector B.

The process steps shown in FIG. 6e3 handle situations in which people leave the queue 50 by traversing the areas 210D through 210A. It handles situations in which a person completely leaves the queue (steps 942 through 958) and in which a person backs up, after partially exiting the queue, and reenters (steps 960 through 972). These process steps are the reverse of the steps 906 through 936, described above and, so, do not need to be described in detail.

Figure 7:
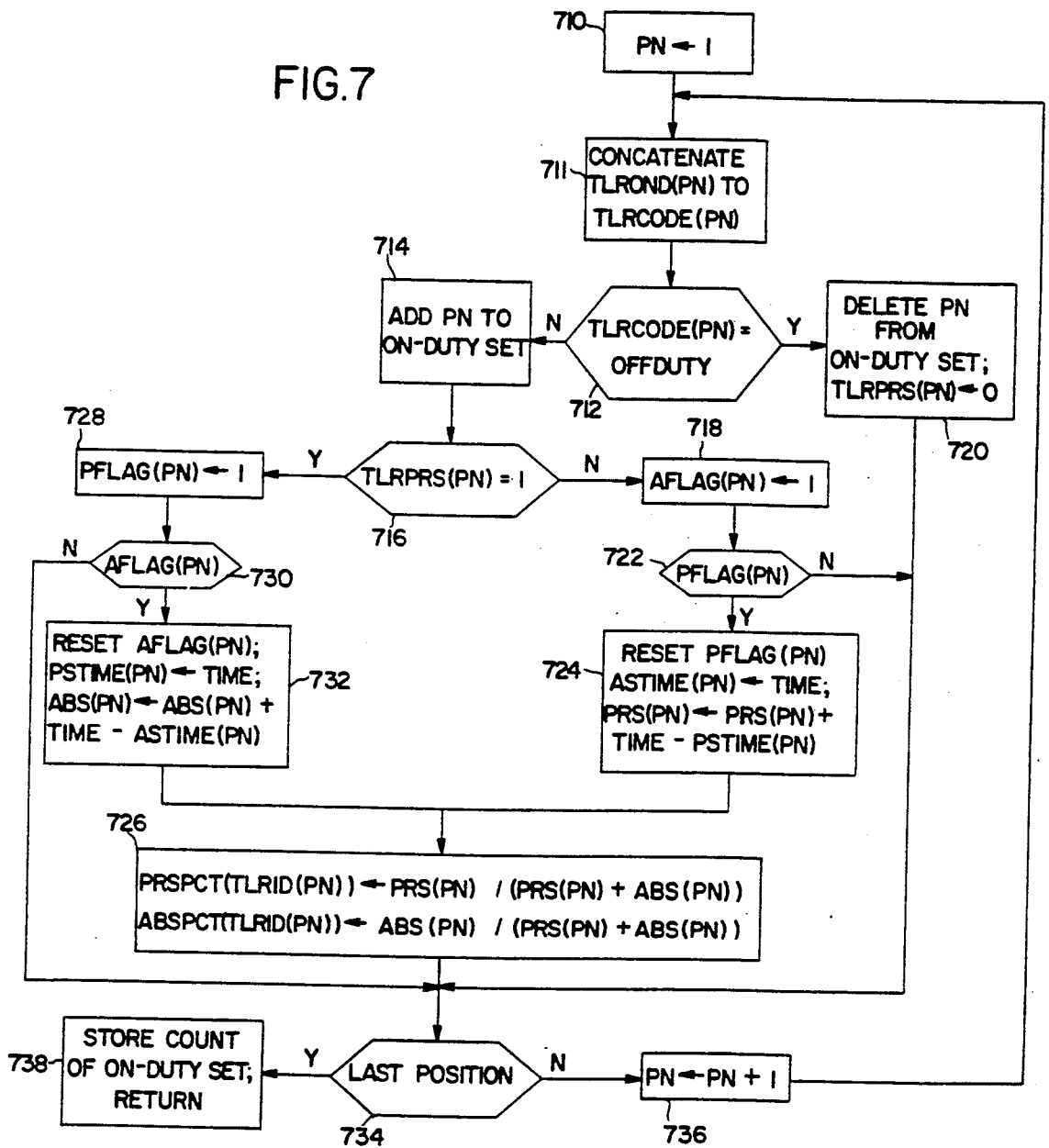

FIG. 7 is a flow-chart diagram which illustrates how statistics may be gathered from changes in the sensor areas detected by the processes described above in reference to FIGS. 6a through 6e3. The system operator may want a relatively large number of statistics, for example, the number of on-duty tellers, the amount of time that an on-duty teller is absent from his station, the average amount of time that each teller spends with a customer, the number of customers waiting in the queue and the number of customers entering the queue. It may be desirable to have each of these statistics keyed to times during the day and/or days during the week.

The complete description of how each of these statistics may be gathered would be unduly repetitive. An exemplary statistics collecting process is shown in the flow-chart of FIG. 7. This process gathers statistics on the number of on-duty tellers and the portion of time that an on-duty teller is absent from his station. In addition, the process collects a coded value which is transmitted by pulsing the teller on-duty light at a rate compatible with the image capture rate of the video cameras 102 and 104. One skilled in the art of computer programming could readily extend the described techniques to gather other statistical information.

The first step in the process shown in FIG. 7, step 710, sets the position number variable, PN, to 1, indicating the first teller position. Step 711 concatenates the current value of the teller on duty indicator for the teller position, TLROND(PN), to a value TLRCODE(PN). TLRCODE(PN) is a value having a fixed number of bits. As a new bit is concatenated onto the value, the oldest bit is shifted off of the other end. Code values are recognized based on the current values of all of the bits of TLRCODE(PN). In this embodiment of the invention, a TLRCODE(PN) value having all of its bits zero, represents an off duty code (OFF-DUTY) and a value having alternating one and zero valued bits represents a help request code (HELPREQ). In this embodiment of the invention, The value OFFDUTY is generated when the on-duty lamp has been off for a number of seconds equal to the number of bits in TLRCODE(PN) and the value HELPREQ is generated by pulsing the on-duty lamp on and off for successive one second intervals for a number of seconds equal to the number of bits in TLRCODE(PN). It is contemplated that other code values may be transmitted. or that the message rate may be increased by increasing the rate at which images are grabbed from the cameras. Furthermore, it is contemplated that analog signals may be transmitted which may be detected as sampled data digital values. These values would be transmitted by modulating the on-duty lamp to produce different illumination intensities during different time intervals and storing the average value of the digitized pixel values in the sensor area for the on-duty lamp that have been captured during each of the time intervals.

Step 712 determines if the analysis of the image performed by the teller counter process determined that the teller at position PN is off-duty (i.e. that TLRCODE(PN) is equal to OFFDUTY). If not, position PN is added, at step 714, to the on-duty set. If PN was already a member of the on-duty set, there is no change. Otherwise the membership of the set is increased by one. Next, step 716 is executed to determine if a teller is present at station PN. If the answer is no, step 718 is executed which sets the absent flag for the position PN, AFLAG(PN).

If, at step 712, there is no teller on-duty at position PN, step 720 is executed which deletes position PN from the on-duty set and resets the teller present indicator, TLRPRS(PN). Step 720 transfers control to step 734 described below.

After setting the absent flag at step 722, the host processor 305 checks the present flag for the position, PFLAG(PN). If the present flag is reset then the absent flag was previously set and so, there has been no change in the status of the teller station. In this instance, control is transferred to step 734, described below.

If, however, at step 722, PFLAG(PN) is found to be set, then there has been a change in status. The previously present teller is now absent while still being on-duty. In this instance, the host processor 305, at step 724, resets PFLAG(PN) and stores the current time value into a location, ASTIME(PN), which holds the absent-start-time for the position PN. In addition, the processor 305 adds the difference between the current time value and PSTIME(PN), the stored present-start-time for the position PN, to PRS(PN), the total time that the teller is present at his station while on-duty.

Alternately if, at step 716, a teller is found to be present at position PN, step 728 is executed to set PFLAG(PN), the present flag for the position PN. Step 730 checks the absent flag for the position. If this is reset, then there has been no change in state in the teller position and control is transferred to step 734, described below. Otherwise, step 732 is executed. This step resets AFLAG(PN), the absent flag for the position, and stores the current time value into PSTIME(PN). Finally, at step 732, the processor 305 adds the difference between the current time and ASTIME, the stored absent-start-time, to ABS(PN) a memory location that holds the total time that the teller has been absent from his station while on-duty.

After either step 724 or step 732, step 726 is executed which calculates the portion of time that the teller has been present at his station and the portion of time that he has been absent from his station. In these calculations, the expression TLRID(PN) holds an identifier which associates a particular individual with the position PN. Thus, the statistics on presence and absence are kept on each individual teller, not on teller positions.

Step 734 determines if current statistics have been gathered for all of the teller positions. If not, the variable PN is incremented at step 736 and control is transferred to step 712. Otherwise, at step 738, the current number of entries in the on-duty set is recorded with an indication of the current time and control is returned to the main process shown in FIG. 4.

The number of on-duty tellers is recorded at step 738 to provide a set of statistics that may be used, for example, to generate a histogram of on-duty tellers versus time for each day of the week. This statistical information may be used for personnel scheduling in the bank.

The last step in the main process shown in FIG. 4, step 424, generates the displays which appear on the customer monitors 106 and 108, shown in FIG. 1, and on the operator display terminal 309. The display on monitor 106 directs the first waiting customer to an available teller. The display on the monitor 108 informs customers arriving at the bank of the amount of time they may expect to wait before being served. The exemplary display on monitor 309 indicates that a teller has requested assistance.

The first step of the process which generates these displays, step 810, sets the position number variable PN to 1 and sets a variable OPENPN to zero. The variable OPENPN holds the position number of an open teller position if one exists. Step 812 begins the loop through all of the teller positions. At step 812, the variable SPOTOPEN is set to true if the teller at the position is on duty and present and if no customer is present. At step 814, the host processor 305 tests the value of SPOTOPEN. If, at step 814, SPOTOPEN is set, step 815 is executed which assigns the current teller position number, PN, to the variable OPENPN.

If SPOTOPEN is reset at step 814, or after step 815, step 817 is executed. This step compares the current value of TLRCODE(PN) to the value represented by HELPREQ. If these values are found to be equal, step 819 is executed which displays a message on the operator monitor 309 indicating that the teller at station PN needs assistance.

After step 819, or if TLRCODE(PN) is not equal to HELPREQ at step 817, step 816 is executed. This step compares PN to the largest position number. If PN is less than this number, step 818 is executed which increments pN and transfers control to step 812, described above.

If all of the teller positions have been evaluated at step 816, step 821 is executed. This step determines if an open teller position was found. If so, step 823 is executed. This step displays a message on monitor 106 indicating that a teller is available at the teller position stored in OPENPN. If, at step 821, no open positions were found, step 820 is executed which displays a message on monitor 106 asking the person at the head of the queue to wait for the next available teller.

After either step 820 or step 823, the host processor 305 executes step 822. At this step, the host processor 305 averages the average service times for each of the active teller positions and stores the result in the variable ET. The average service times are obtained in a section of the statistics gathering process which is not shown in FIG. 7. The basic algorithm (not shown) used to obtain this statistic measures each time interval that a teller is serving a customer by recording the system time values when CUSPRS(PN) changes from zero to one and when CUSPRS(PN) changes from one to zero. The time spent with the customer is the second time value minus the first time value. The system also maintains a count of customers which have been served at a given teller position. When a new customer time is obtained, the processor 305 multiplies the previous average time for the teller station by the number of customers previously served, adds the new customer time and divides by the new number of customers that have been served. This produces a group of average time values, TLRTIM(PN), one for each on-duty teller position.

Next, at step 824, the expected waiting time for a customer entering the queue is calculated as the value held by ET times the value held by QUEUECOUNT. At step 826, this time is displayed on the monitor 108 as the expected waiting time until the next teller is available. At step 828, the display generation process returns control to the main process shown in FIG. 4.

The calculation of the value EW described above may be unduly optimistic. It assumes that all tellers will be at their stations and that there is no time lapse between the end of service for one customer and the start of service for the next customer. Accordingly, it may be desirable to divide the value EW by the value PRSPCT(TLRID(PN)), calculated at step 726 of FIG. 7 and to add an average expected inter-customer time for each customer currently in the queue. Each inter-customer time may be calculated as the difference between the time that a customer position is first detected as empty and the time that the position is detected as occupied. Inter-customer times are only recorded when QUEUECOUNT is non-zero.

The invention has been described in the context of a bank monitoring system. This system has advantages over other prior-art bank monitoring systems since all of the relevant areas may be monitored using two video cameras. Thus, this system entails significantly less wiring than the prior-art systems which use multiple sensors. This is a significant advantage since it allows the bank personnel greater freedom to change the decor of the bank. In addition, it is contemplated that each of the remote devices, the cameras 102 and 104 and the monitors 106 and 108 may be linked to the computer 110 via electromagnetic radiation, such as infra-red light beams. This would further reduce the wiring needed to install the system into a bank.

Although the system has been described in the context of a bank, it is contemplated that it may be adapted for general use in an office environment. In this alternative embodiment (not shown), each desk in the office is equipped with a lamp which the worker turns on when he is serving a customer or performing a task and turns off when he is through. A single camera mounted on the ceiling coupled to a computer system substantially the same as the system 110, described above, may monitor a group of sensor areas, one for each of the lamps. The lamps may be manually operated or may be programmed to emit codes such as described above in reference to the teller on-duty lamps. When codes are emitted, the monitoring system may be viewed as a data collection system, gathering coded messages from each of the monitored sensor areas.

Alternatively, instead of using a lamp to gather data on worker performance, the monitoring system may be programmed to monitor the in-basket and out-basket of each worker. In this embodiment of the invention, the various matters that each worker could handle may each be held in a different color folder. The system could monitor the tasks that the worker receives by noting changes in the in-basket sensor areas; tasks that the worker completes by noting changes in the out-basket sensor area and expected time to handle an individual project by combining statistics from the two monitored areas.

It is contemplated that the invention may be used in any application in which items are queued to be served by multiple servers. The items may be people, animals or articles of manufacture.

Although the invention has been described in terms of several exemplary embodiments it may be practiced as outlined above within the scope of the appended claims.

The invention claimed is:

1. A remote sensing system for detecting the occurrence of at least first and second contemporaneous events, comprising:

imaging means for capturing electronic signals representing an image of an area including at least first and second predetermined sub-areas in which the first and second events may occur;

address memory means for holding data values defining the first and second predetermined sub-areas of the image;

means for extracting a number of data values from the electronic signals the extracted data values representing only the first and second predetermined sub-areas of the image, the number of extracted data values being a less than a number of data values representing the entire image of the area; and analyzing means for comparing the extracting data values to reference image data values, representing the first and second predetermined sub-areas before the occurrence of the first and second events, to determine if the first and second events have occurred in the respective first and second sub-areas.

2. The remote sensing system of claim 1 wherein:

the first and second events to be detected are the presence of first and second objects in the first and second sub-areas and the first and second objects have specific characteristics;

the remote sensing system further includes data memory means for holding the reference image data values; and said analyzing means further includes:

means for generating difference data representing the difference between the extracted data values and the reference data values; and means for analyzing the difference data values for the specific characteristics to determine if the first and second objects are present in the respective first and second sub-areas.

3. The remote sensing system of claim 2 wherein the specific characteristics include characteristics concerning motion which the object may exhibit and said means for analyzing includes:

means for storing difference data representing the difference between the reference data and extracted data captured during a prior time interval; and means for comparing the difference data to the stored difference data to determine if motion is indicated n at least one of the first and second sub-areas and if the indicated motion is consistent with the specific characteristics of the object.

4. The remote sensing system of claim 1 further comprising:

light source means, responsive to a control signal, for emitting varying levels of illumination; and means for encoding a data message and for modulating said control signal with the encoded data message;

wherein:

one of said first and second predetermined sub-areas includes an image of said light source means, the reference image data values corresponding to said one predetermined sub-area represent said light source means providing a predetermined level of illumination and the event to be detected is a change in the level of illumination emitted by said light source means; and the analyzing means includes means for comparing the extracted data taken during respectively different time intervals to the reference data values for said one predetermined sub-area to regenerate said encoded data message.

5. The remote sensing system of claim 4 wherein:

said means for encoding said data message includes means for converting said message into a bit-serial binary signal;

said light source means is responsive to said control signal for emitting light of first and second levels of illumination; and said analyzing means records said first level of illumination as a binary one and said second level of illumination as a binary zero to regenerate the bit-serial binary signal.

6. The remote sensing system of claim 4 wherein:

the other one of said first and second predetermined sub-areas includes an individual and the encoded data message contains data relating to the individual.

7. The remote sensing system of claim 1, further including means for specifying the data values defining at least one of the first and second predetermined sub-areas of the image, comprising:

means for capturing electronic signals representing successive images from said imaging means;

means for detecting at least one of said electronic signals representing an element of said image having a predetermined level of illumination;

means for assigning first and second coordinates in said image to said detected image element; and means for evaluating said first and second coordinates for selection as one of the data values defining said one predetermined sub-area.

8. The remote sensing system of claim 7, wherein the first and second coordinates are selected as center coordinates of said one predetermined sub-area; and said remote sensing system further includes means for specifying an area about said center coordinates which is to be encompassed by the data values defining said one predetermined sub-area.

9. The remote sensing system of claim 7 wherein said means for evaluating includes:

means for comparing said first coordinate with previously determined first coordinates to define maximum and minimum values for said first coordinate; and means for comparing said second coordinate with previously determined second coordinates to define maximum and minimum values for said second coordinate;

wherein the respective maximum and minimum values for said first and second coordinates constitute the data values defining said one predetermined sub-area.

10. The remote sensing system of claim 1 further including:

means for associating said first sub-area with a first class of individuals and for associating said second sub-area with a second class of individuals; and signalling means for indicating a predetermined relationship between said first class of individual sand said second class of individuals responsive to the detected occurrence of said first and second contemporaneous events.

11. The remote sensing system of claim 10 wherein the first class of individuals includes bank tellers and the second class of individuals includes bank customers and the signalling means indicates that a bank teller is serving a bank customer responsive to the detected occurrence of said first and second contemporaneous events.

12. The remote sensing system of claim 1, further including:

means, coupled to said analyzing means for recording the occurrence of said first and second events to maintain a historical record of events occurring in said first and second sub-areas.

13. A method for detecting the occurrence of first and second contemporaneous events in respective predetermined first and second sub-areas of a remote area, comprising the steps of:

capturing electronic signals representing an image of the remote area including the predetermined first and second sub-areas;

extracting a number of data values, representing only the predetermined first and second sub-areas of the image, from the electronic signals, wherein the number of extracted data values is a less than a number of data values representing the entire image of the remote area; and automatically comparing the extracted data values to reference image data values representing the first and second sub-areas before the respective first and second events have occurred to determine if the respective first and second events have occurred.

14. The method of claim 13 where the events to be detected are the presence of first and second objects in the respective first and second sub-areas, said first and second objects having specific characteristics, and the step of automatically comparing the extracted data values includes the steps of:

storing the reference image data values;

generating difference data values representing the difference between the extracted data values and the reference data values;

analyzing the difference data values for the specific characteristics to determine if the first and second objects are present in the respective first and second sub-areas.

15. The method of claim 13 wherein one of the predetermined first and second sub-areas includes a light source and the event to be detected is a coded message transmitted by modulation of the intensity of the light emitted by said light source and said reference image data values corresponding to said one sub-area represent a predetermined level of illumination of said light source, said method further including the steps of:

comparing the extracted data to said corresponding reference data values to provide a signal indicating whether said extracted data value is greater than or less than said reference intensity value; and recording successive signal values to regenerate said coded message.

16. A method of monitoring a queue of people comprising the steps of:
- generating electronic signals representing successive images of the queue as seen from a remote location;
- extracting, from said electronic signals, first and second sets of successive data values representing a time sequence of images of respective areas surrounding an entrance into the queue and an exit from the queue, respectively;
- analyzing the data values representing each of the time sequences of images to detect motion into the queue and motion out of the queue;
- increasing a count of people in the queue when motion into the queue is detected; and
- decreasing the count of people in the queue when motion out of the queue is detected.

17. The method of claim 16 further comprising the steps of:
- monitoring the count of people in the queue to determine when the count value is less than a predetermined value;
- capturing electronic signals representing at least a portion of the queue when said count value is less than the predetermined value;
- analyzing said captured electronic signals to count the number of people in the queue; and
- setting said count value to the number of people counted in the analyzing step.

18. The method of claim 17 where the predetermined value is unity and the setting step sets the count value to zero when the analyzing step indicates that the queue is empty.

19. In a system for processing a group of items, a method of automatically determining an expected waiting time for an item entering a queue which feeds a set of servers, each of which process one item at a time, the method comprising the steps of:
- generating electronic signals representing successive images of the queue and the servers as seen from a remote location;
- extracting, from said electronic signals, data values representing sub-areas of the image including the queue and each of the servers;
- analyzing the image data obtained from each of the sub-areas for each of the servers to determine an expected service time for each server;
- averaging the expected service time for all servers to obtain an average expected service time;
- analyzing the image data obtained from the sub-area for the queue to determine the approximate number of people in the queue; and
- multiplying the determined approximate number of people in the queue by the average expected service time to obtain the expected waiting time in the queue for the item entering the queue.

* * * * *